US010084593B2

(12) United States Patent
Lablans

(10) Patent No.: US 10,084,593 B2
(45) Date of Patent: Sep. 25, 2018

(54) APPARATUS FOR UNCONVENTIONAL NON-LINEAR FEEDBACK SHIFT REGISTERS (NLFSRS)

(71) Applicant: Peter Lablans, Morris Township, NJ (US)

(72) Inventor: Peter Lablans, Morris Township, NJ (US)

(73) Assignee: Ternarylogic LLC, Morristown, NJ (US)

( * ) Notice: Subject to any disclaimer, the term of this patent is extended or adjusted under 35 U.S.C. 154(b) by 271 days.

(21) Appl. No.: 15/001,157

(22) Filed: Jan. 19, 2016

(65) Prior Publication Data

US 2016/0211971 A1    Jul. 21, 2016

Related U.S. Application Data

(60) Provisional application No. 62/105,718, filed on Jan. 20, 2015.

(51) Int. Cl.
*G06F 21/00* (2013.01)
*H04L 9/06* (2006.01)
(52) U.S. Cl.
CPC ............ *H04L 9/065* (2013.01); *H04L 9/0643* (2013.01)
(58) Field of Classification Search
None
See application file for complete search history.

(56) References Cited

U.S. PATENT DOCUMENTS

| 3,911,330 A | | 10/1975 | Fletcher et al. | |
|---|---|---|---|---|
| 4,686,655 A | * | 8/1987 | Hyatt | B60R 16/0373 367/41 |
| 5,056,398 A | * | 10/1991 | Adamson | G10G 7/02 84/454 |
| 5,363,448 A | * | 11/1994 | Koopman, Jr. | G06F 7/584 340/5.26 |
| 6,529,487 B1 | * | 3/2003 | Rose | H04L 9/0625 370/319 |
| 6,560,212 B1 | | 5/2003 | Prasad et al. | |
| 6,665,692 B1 | * | 12/2003 | Nieminen | G06F 7/584 375/E1.014 |
| 6,769,084 B2 | | 7/2004 | Kim et al. | |

(Continued)

OTHER PUBLICATIONS

Barat, Francisco; Lauwereins, Rudy; Deconinck, Geert. Reconfigurable Instruction Set Processors from a Hardware/Software Perspective. IEEE Transactions on Software Engineering, vol. 28, Issue: 9. Pub. Date: 2002. https://ieeexplore.ieee.org/stamp/stamp.jsp?tp=&arnumber=1033225.*

(Continued)

*Primary Examiner* — Jeremiah Avery

(57) ABSTRACT

A sequence generator implemented on a processor that generates a sequence of signals applies a feedback shift register with feedback. A feedback loop connects at least a first and a second shift register element to last shift register element to a first shift register element of the shift register and includes at least one two-input n-state switching functions that is characterized by non-associative switching functions or switching tables. The sequence generator may be part of a scrambler, an autonomous sequence generator, a hash code generator, a communication device, and a data storage device.

20 Claims, 19 Drawing Sheets

(56) References Cited

U.S. PATENT DOCUMENTS

| | | | | |
|---|---|---|---|---|
| 7,660,973 | B2* | 2/2010 | Hansen | G06F 9/30014 712/222 |
| 2004/0205095 | A1* | 10/2004 | Gressel | G06F 7/582 708/253 |
| 2006/0082418 | A1* | 4/2006 | Wood | G06F 1/10 331/57 |
| 2011/0219208 | A1* | 9/2011 | Asaad | G06F 15/76 712/12 |
| 2012/0121081 | A1 | 5/2012 | Boehl et al. | |
| 2016/0210226 | A1* | 7/2016 | Hall | G06F 11/3672 |

OTHER PUBLICATIONS

Ito, Tasuku; Kameyama, Michitaka. Universal VLSI Based on a Redundant Multiple-Valued Sequential Logic Operation. 37th International Symposium on Multiple-Valued Logic 2007. ISMVL 2007. Pub. Date: 2007. https://ieeexplore.ieee.org/stamp/stamp.jsp?tp=&arnumber=4215962.*

Cardarilli, Gian Carlo; Nannarelli, Alberto; Oster, Yann; Petricca, Massimo; Re, Marco. Design of Large Polyphase Filters in the Quadratic Residue Number System. 2010 Conference Record of the Forty Fourth Asilomar Conference on Signals, Systems and Computers. Pub. Date: 2010. https://ieeexplore.ieee.org/stamp/stamp.jsp?tp=&arnumber=5757589.*

Elena Dubrova, A List of Maximum Period NLFSRs, Mar. 27, 2012, 9 pages, Royal Institute of Technology (KTH), Forum 120, 164 40 Kista, Sweden.

Elena Dubrova, Finding Matching Initial States for Equivalent NLFSRs in the Fibonacci and the Galais Configurations, Feb. 17, 2013, 4 pages, Royal Institute of Technology (KTH.

Lena Dubrova, An Equivalence-Preserving Transformation of Shift Registers, Nov. 18, 2014, 12 pages, Royal Institute of Technology (KTH), Kista, Sweden.

Dubrova et al., On Analysis and Synthesis of (n,k)-Non-Linear Feedback Shift Registers, Dec. 7, 2007, 6 pages, Royal Institute of Technology (KTH), Kista, Sweden.

De Canniere et al, Trivium Specifications, 7 pages, Katholieke Universiteit Leuven, Heverlee, Belgium, www.ecrypt.eu.org/stream/p3ciphers/trivium/trivium_pdf, date: 2006.

* cited by examiner

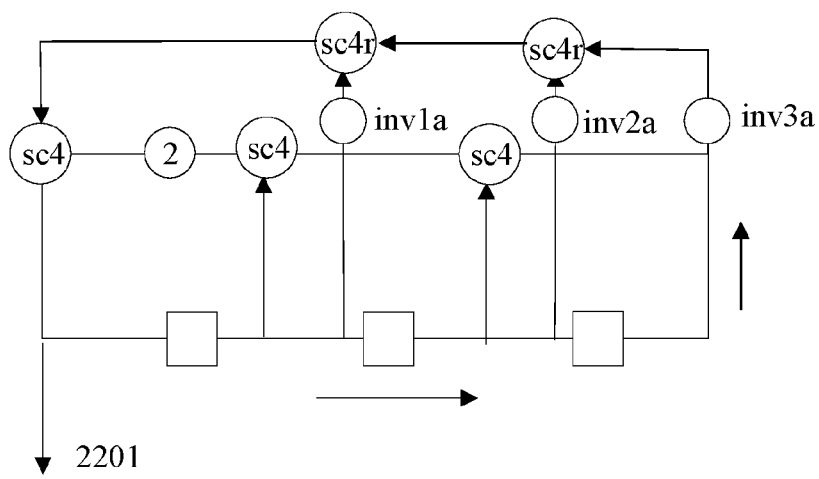

FIG. 22

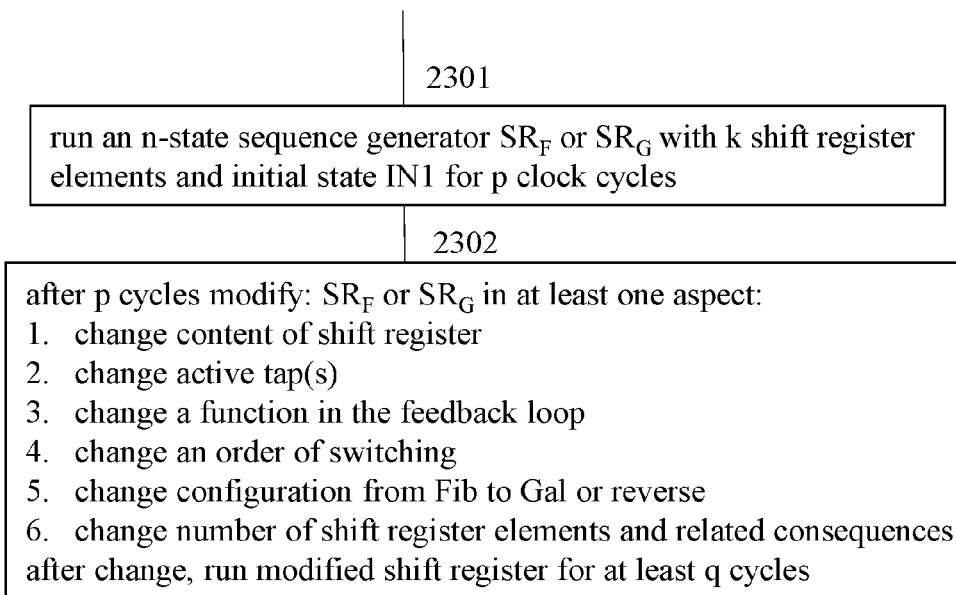

2301 run an n-state sequence generator $SR_F$ or $SR_G$ with k shift register elements and initial state IN1 for p clock cycles 2302 after p cycles modify: $SR_F$ or $SR_G$ in at least one aspect:
1. change content of shift register
2. change active tap(s)
3. change a function in the feedback loop
4. change an order of switching
5. change configuration from Fib to Gal or reverse
6. change number of shift register elements and related consequences
after change, run modified shift register for at least q cycles

FIG. 23

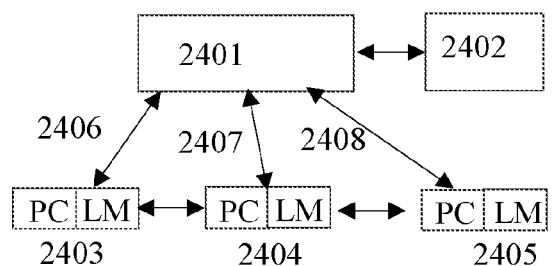

FIG. 24

```
firarn =

```
seqlistn =

```
firarn =                                    seqlistn =

```
firarn =                                    seqlistn =

```
firarn =
     1     1    33     1     1     1     2
     2     2    34     1     1    64     7
     3     3    35     1     1     6    18
     4     4    36     1     1    63    12
     5     5    37     1     1     5    26
     6     6    38     1     1    17    38
     7     7    39     1     1    11    32
     8     8    40     1     1    62    23
     9     9    41     1     1     4    14
    10    10    42     1     1    25    28
    11    11    43     1     1    16    47
    12    12    44     1     1    37    45
    13    13    45     1     1    10    35
    14    14    46     1     1    31    54
    15    15    47     1     1    22    51
    16    16    48     1     1    61    43
    17    17    49     1     1     3     8
    18    18    50     1     1    13    19
    19    19    51     1     1    27    39
    20    20    52     1     1    24    33
    21    21    53     1     1    15    29
    22    22    54     1     1    46    48
    23    23    55     1     1    36    55
    24    24    56     1     1    44    52
    25    25    57     1     1     9    20
    26    26    58     1     1    34    40
    27    27    59     1     1    30    49
    28    28    60     1     1    53    56
    29    29    61     1     1    21    41
    30    30    62     1     1    50    57
    31    31    63     1     1    42    58
    32    32    64     1     1    60    59
```

```
firar4 =
 1    1   17   33   49    0    0    0    0    0    0    0    0
 2    2   18   34   50    0    0    0    0    0    0    0    0
 3    3   19   35   51    0    0    0    0    0    0    0    0
 4    4   20   36   52    0    0    0    0    0    0    0    0
 5    5   21   37   53    0    0    0    0    0    0    0    0
 6    6   22   38   54    0    0    0    0    0    0    0    0
 7    7   23   39   55    0    0    0    0    0    0    0    0
 8    8   24   40   56    0    0    0    0    0    0    0    0
 9    9   25   41   57    0    0    0    0    0    0    0    0
10   10   26   42   58    0    0    0    0    0    0    0    0
11   11   27   43   59    0    0    0    0    0    0    0    0
12   12   28   44   60    0    0    0    0    0    0    0    0
13   13   29   45   61    0    0    0    0    0    0    0    0
14   14   30   46   62    0    0    0    0    0    0    0    0
15   15   31   47   63    0    0    0    0    0    0    0    0
16   16   32   48   64    0    0    0    0    0    0    0    0
```
4001

```
firar4 =
 1    1   17   33   49    1    1    1    1    4    5    8    1
 2    2   18   34   50    1    1    1    1    7   13   19   25
 3    3   19   35   51    1    1    1    1   64   10   16   22
 4    4   20   36   52    1    1    1    1    3   37   47   56
 5    5   21   37   53    1    1    1    1    6   11   14   38
 6    6   22   38   54    1    1    1    1   12   29   30   41
 7    7   23   39   55    1    1    1    1   18   28   32   35
 8    8   24   40   56    1    1    1    1   24   40   50   59
 9    9   25   41   57    1    1    1    1    9   17   20   48
10   10   26   42   58    1    1    1    1   15   31   33   51
11   11   27   43   59    1    1    1    1   21   34   44   45
12   12   28   44   60    1    1    1    1   63   27   43   53
13   13   29   45   61    1    1    1    1    2   23   26   57
14   14   30   46   62    1    1    1    1   36   39   42   60
15   15   31   47   63    1    1    1    1   46   49   52   54
16   16   32   48   64    1    1    1    1   55   58   62   61
```
4002

FIG. 40

APPARATUS FOR UNCONVENTIONAL NON-LINEAR FEEDBACK SHIFT REGISTERS (NLFSRS)

CROSS-REFERENCE TO RELATED APPLICATIONS

This application claims the benefit of U.S. Provisional Patent Application Ser. No. 62/105,718, filed Jan. 20, 2015 which is incorporated herein by reference in its entirety.

BACKGROUND OF THE INVENTION

The present invention relates to generation apparatus that is shift register generator based in apparatus for storing or transmission of data.

A symbol herein is a representation of one or more signals. Humans are good at processing characters, symbols signs and images. Devices and apparatus working under control of a processor are well suited to process signals. In common language, it is often expressed that machines such as computers process and store symbols and images. This is an anthropomorphism that is incorrect. Computing devices are switching machines that change switching states based on a state or property of a signal. While it may appear that a machine "knows" what it is doing, it really doesn't. This may appear to be a philosophical issue, but in the context of the requirements of a U.S. patent disclosure, it is not. While a symbol is something that is associated with humans, related to computing devices a symbol is a representation of a signal. Furthermore, a symbol in human terms can be any of a set of symbols, characters of an alphabet, algebraic or mathematical symbols, pictograms, pixel or digits in a numbering system. A machine, currently, for processing requires a translation or an assignment of a symbol into a pre-defined signal, usually within fairly tight specifications, before it can process the signals in accordance with the assigned meaning of symbols. For instance a symbol such as a letter in an alphabet, such as 'q', in general in binary processing, is to be translated in a series of bits, for instance a byte of 8 bits. While one applies the term bit, it is well understood in the art that a bit is also a defined signal.

For instance the letter 'q' may be entered from a keyboard, by pressing a key bearing the letter 'q' as a sign for humans. It is to be understood that this assignment of meaning is to a certain level arbitrary. The lower case 'q' in ASCII is assigned code 113. The signals representing 113 should be used consistently to represent 'q'. However, internal to a computing device no letter 'q' exists, only signals in a byte that represent the value 113 in the binary case.

Symbols herein thus have at least one of 2 states and often have more than 2 states. If a signal consists of 8 bits or binary signals it can be interpreted as a 256-state signal. Devices such as D/A converters can be used to convert 8 bits into a single signal that can have 256 states. A signal state can be a signal level such as a voltage or light intensity or any other phenomenon that has one of n occurrences. However, the state can also be a physical property that is not related to its intensity or magnitude. For instance a state of a signal can be a frequency or wavelength or any other phenomenon, including a position or elative position, the presence of a material, a quantum-mechanical state and any other phenomenon that can be distinguished from another one. QAM signals are for instance an example of mixed state signals, wherein relative angle and amplitude define a state space. Accordingly one can actually have multiple physical phenomena to represent a single state of an n-state signal.

The signal may be an electric signal, an optical signal, a biological signal, an acoustical signal, a mechanical signal, a presence of a materials or a change in a state of a material such as a change of a quantum-mechanical state or any other phenomenon that indicates a state or a change of state. In addition, a symbol can represent a single signal. For instance a bit can be represent a signal that can have one of 2 states, like on or off for an electrical signal. A symbol can also represent a plurality of symbols that by itself represent a higher order symbol. As mentioned before, a character can be one of 256 symbols, which is a representation of 8 binary signals.

By using A/D and D/A converters one can convert and process n-state signals as binary words in accordance with n-state switching tables, but provide true n-state signals on an output. In one embodiment a general computer is a device to receive, to process and to generate an n-state signal such as a 3-state, a 4-state an 8-state a 256-state or any state signal that fits within the processing capability of the general computer that is further provided with A/D and D/A converters. The general has a processor and a memory. The computer has loaded and activated the computer application Matlab®, marketed by the Mathworks, Inc. of Natick, Mass. The active screen in Matlab is called the command window that is displayed on a display screen of the computer and is responsive to a command, which may be activated from a memory as a scripted program or via commands provided from a keyboard. One can enter from the keyboard the command: sc2=[0 1;1 0]. This causes an addressable matrix or table sc2 to be stored in memory. The addresses are formed by the indices originated from 1 and up for the position of rows and columns in the matrix. That first row of the matrix is [0 1] and the second row is [1 0]. The first column is $$\begin{bmatrix} 0 \\ 1 \end{bmatrix}$$

and the second column is $$\begin{bmatrix} 1 \\ 0 \end{bmatrix}.$$

To address the matrix and generate an output, the command sc2(1,2) may be provided. This generates the element of the matrix in the first row and second column of sc2, which is a 1.

One of ordinary skill will recognize that the matrix sc2 is the truth table of the binary logic function XOR. There appears to be a mismatch between the states of the truth table and the applied index system. One is reminded that binary states as displayed are merely symbols that are derived from actual signals. Each of the signals that are applied clearly has to be binary. That is, each address of the matrix sc2 is (a,b) wherein 'a' and 'b' are binary symbols, each symbol being represented by or being a representation of a signal. Matlab works with matrices in origin 1. That is each index for a matrix in Matlab address starts at 1. In binary logic one commonly uses the logic states True/False; On/Off or 1/0. Binary logic or switching logic is commonly used to describe switching devices. In its earliest use this was disclosed by Claude Shannon in his M.S. Thesis: A Symbolic Analysis of Relay and Switching Circuits dated by stamp on Dec. 20, 1940 at MIT and signed by Claude Shannon on Aug. 10, 1937. (see <<www.cs.virginia.edu/~robins/Shannon_MS_Thesis.pdf>>. This thesis document is incorporated herein by reference.

What is clear from this and other known documents is that the symbols 0 and 1 used in the context of switching and computer technology represent "logic values" which are human interpretations of underlying real physical phenomena or physical states or signals. While it is common to mention states 0 and 1 with relation to computers these symbols 0 and 1 represent real physical states. These symbols are used in computer arithmetic to seemingly represent numbers in a radix-2 representation. This is for human convenience. There is no physical reason to use the symbols 0 and 1 to represent the actual physical states or signals. The binary states can also be called 1 and 2. By doing that a symbol representing an input signal also is part of an index identifying an output state of the matrix sc2. This is called using representation in origin 1. After generating a resulting switching state determined by the switching table sc2 the device then provides the resulting state as a signal on an output. This output signal can be provided on a channel for transmission or on an input for further processing by yet another switching device, or it is provided on a memory for storage.

In the exemplary embodiment of the present invention with a computer the output is connected to a display screen and the output signal activates pixel elements on the screen to display a symbol. The matrix sc2 is activated by entering in the command window via the keyboard of the computer in Matlab the statement sc2=[1 2;2 1] followed by a=2 and b=1. By typing sc2(a,b) the computer outputs and displays the symbol 2 on the screen. The keyboard has over 40 keys, which each can be activated mechanically. Each key on the keyboard has a different position. Each key, when activated generates one or more signals that uniquely corresponds to that key. Accordingly, the keys with marks 1 and 2 represent signals, when activated, which has one of 2 states. The output symbol on the screen (which in accordance with sc2 can be 1 or 2) represents a signal which has one of two states. Accordingly, the computer as described implements a physical device that is described by a binary switching table.

The computer running Matlab operates in origin 1. Other programming languages such as APL run in origin 0 and use the symbols 0 and 1 as proper input and output symbols. The switching tables are also origin 0.

The computer running Matlab in a further embodiment of the present invention are configured to run and implement 3-state switching devices, for instance by activating matrix sc3=[1 2 3;2 3 1;3 1 2] or matrix sc4=[1 2 3 4;2 3 4 1;3 4 1 2;4 1 2 3] or any other n-state matrix that is used as a switching device. One dimensional matrices or vectors are used to implement inverters such as: inv2=[2 1]; inv3=[3 2 1], inv=[4 3 2 1] or any other inverter.

The above describes how generic computers or processors with memories are configured as a specific switching device that implement or realize an n-state switching device with n=2 or n>2. Other realizations or implementations of n-state switching devices are possible. One can use binary combinational switching devices of which the XOR, NAND, AND, OR, NOR, INVERTER and other gates are known. With these circuits any other binary and non-binary switching table can be realized. If needed A/D and D/A converters can be applied, though a word of 2 or more bits is specifically considered to be an n-state signal. An addressable memory such as a RAM, ROM, PROM, EPROM, magnetic, opto-electronic, quantum-mechanical, or any other storage or memory device can be used to store and retrieve states of an n-state switching table. If needed A/D and D/A converters are used if the memory/storage device only stores binary signals.

Embodiments of the present invention apply switching functions that are also called logic functions. These functions represent devices that generate one or more signals based on one or more input signals, wherein the signals for the purpose of description are represented by one or more symbols.

Storage and/or transmission of signals require sometimes a minimum amount of transitions between signal states. One reason is to assist clock recovery circuitry to extract sufficient information to generate a correct clock signal. In other applications there is a need for security. For instance, an information carrying signal stream is reversibly combined with a stream of random like signals to hide the information signal stream from unauthorized reading. In yet other applications one may want to discover if a signal stream is tampered with.

Linear Feedback Shift Registers (LFSRs) are known and are applied in applications such as sequence generators, scramblers, coders, descramblers and decoders. However, sequences generated by LFSRs are believed to be more easily detected and reconstructed by cryptanalysis than for instance sequences generated by non-linear feedback shift register (NLF/SR) based sequence generators.

Shift registers are known devices. They are available as electronic components as a true serial shift register such as the Serial-in to Parallel-out (SIPO)-Serial-in to Serial-out (SISO)-Parallel-in to Serial-out (PISO) and Parallel-in to Parallel-out (PIPO) shift registers, generally under control of a clock signal, but some operating asynchronously. Shift register chips are for instance available from Texas Instruments of Dallas, Tex. and may come in different technologies such as CMOS or TTL with clock speeds well over 10 MHz to over 100 MHz. Non-binary symbol representing shift registers can be formed from using shift register chips connected in parallel wherein a word of bits distributed over several chips forms a word that represents a non-binary symbol that is shifted.

Shift registers are also formed from RAM and are for instance available as a shift register IP core for Field Programmable Gate Arrays and are available from Altera Corporation, of San Jose, Calif.

Shift registers can also be programmed into a programmable processor with access to memory by applying store, retrieve and shift operations. The content of such programmed shift register devices is available or can be updated externally through available I/O ports.

Furthermore, shift registers can be created from individual flip-flops or latches. Non-binary memory elements that can be applied in non-binary shift registers are disclosed in U.S. Pat. No. 7,397,690 issued to Lablans on Jul. 8, 2008 which is incorporated herein by reference.

All non-binary switching devices represented by n-valued switching functions can at least be realized in binary device with required A/D converters at an input and a D/A converter at an output. While the term switching or logic function and n-state, symbols (binary or nonbinary) are used it is to be understood that a symbol is a representation of a signal and a switching or logic function represents a switching device.

The processing of signals represented by symbols takes place at a speed of at least 1000 symbols per second, preferably at a speed of at least 1 million symbols per second and most preferably with a speed of at least 100 million symbols per second. Only machines achieve this processing speed. No human can process symbols at these required speeds. Furthermore, humans cannot process signals as required herein.

The literature asserts that sequences generated by binary shift registers containing only linear feedback functions are easier to detect than sequences generated by sequence generators having also non-linear functions, such as the AND function.

Accordingly, sequences generated by novel and improved devices and methods that cannot be implemented by linear functions only, are required.

SUMMARY OF THE INVENTION

In accordance with an aspect of the present invention a feedback shift register based device is provided to generate a sequence of signals, comprising: a shift register with k shift register elements with k>1 with a feedback loop including a first two-input binary switching device, a switching performance of the first two-input binary switching device being characterized by a non-associative binary truth table selected from the group consisting of a NAND function truth table and non-commutative switching function truth tables; and an output to provide the sequence of signals.

In accordance with another aspect of the present invention a feedback shift register based device is provided further comprising: a second two-input binary switching device being characterized by a non-associative binary truth table, selected from the group consisting of the NAND function truth table, the non-commutative switching function truth tables and a NOR function truth table.

In accordance with yet another aspect of the present invention a feedback shift register based device is provided, wherein the feedback shift register has a Fibonacci configuration.

In accordance with yet another aspect of the present invention a feedback shift register based device is provided, wherein the feedback shift register has a Galois configuration.

In accordance with yet another aspect of the present invention a feedback shift register based device is provided, wherein the feedback shift register based device is part of an autonomously running sequence generator.

In accordance with yet another aspect of the present invention a feedback shift register based device is provided, wherein the feedback shift register based device is part of a signal scrambler.

In accordance with yet another aspect of the present invention a feedback shift register based device is provided, wherein the feedback shift register based device is part of a hash function device.

In accordance with yet another aspect of the present invention a feedback shift register based device is provided, wherein the feedback shift register based device is realized on a processor with a memory; the memory storing at least one additional configuration of the feedback shift register based device, the at least one additional configuration being characterized by one or more parameters of which at least one parameter of the at least one additional configuration determines a device that is operationally different from the feedback shift register device; and the processor is configured to be reconfigured in real-time in accordance with the at least one additional configuration.

In accordance with yet another aspect of the present invention a feedback shift register based device is provided, wherein the one or more parameters are selected from the group consisting of: number of n switching states of an n-state switching function in the at least one additional configuration with n being equal or greater than 2; a truth table of the n-state switching function; a feedback tap configuration; a length of a shift register in the at least one additional configuration.

In accordance with yet another aspect of the present invention a feedback shift register based device is provided, wherein the feedback shift register based device is part of a communication device.

In accordance with a further aspect of the present invention a method is provided to generate a sequence of signals, comprising: generating the sequence of signals with a shift register with k shift register elements with k>1 with a feedback loop from at least two shift register elements of the k shift register elements, to a first shift register element, the feedback loop including a first two-input binary switching device, a switching performance of the first two-input binary switching device being characterized by a non-associative binary truth table selected from the group consisting of a NAND function truth table and non-commutative switching function truth tables; and providing the sequence of signals on an output.

In accordance with yet a further aspect of the present invention a method is provided to generate a sequence of signals, further comprising: including in the feedback shift register a second two-input binary switching device being characterized by a non associative binary truth table, selected from the group consisting of the NAND function truth table, the non-commutative switching function truth tables and a NOR function truth table.

In accordance with yet a further aspect of the present invention a method is provided to generate a sequence of signals, wherein the feedback shift register has a Fibonacci configuration.

In accordance with yet a further aspect of the present invention a method is provided to generate a sequence of signals, wherein the feedback shift register has a Galois configuration.

In accordance with yet a further aspect of the present invention a method is provided to generate a sequence of signals, wherein the feedback shift register based device is part of an autonomously running sequence generator.

In accordance with yet a further aspect of the present invention a method is provided to generate a sequence of signals, wherein the feedback shift register based device is part of a signal scrambler.

In accordance with yet a further aspect of the present invention a method is provided to generate a sequence of signals, wherein the feedback shift register based device is part of a hash function device.

In accordance with yet a further aspect of the present invention a method is provided to generate a sequence of signals, further comprising: realizing the feedback shift register based device is realized on a processor with a memory; storing on the memory at least one additional configuration of the feedback shift register based device, the at least one additional configuration being characterized by one or more parameters of which at least one parameter of the at least one additional configuration determines a device that is operationally different from the feedback shift register device; and reconfiguring the processor in real-time in accordance with the at least one additional configuration.

In accordance with yet a further aspect of the present invention a method is provided to generate a sequence of signals, wherein the one or more parameters are selected from the group consisting of: number of n switching states of an n-state switching function in the at least one additional configuration with n being equal or greater than 2, a truth table of the n-state switching function, a feedback tap configuration, a length of a shift register in the at least one additional configuration and a number of cycles that the at least one additional configuration will run.

In accordance with yet a further aspect of the present invention a method is provided to generate a sequence of signals, wherein the feedback shift register based device is part of a communication device.

DESCRIPTION OF THE DRAWINGS

FIGS. 20-22 illustrate sequence generators provided in accordance with an aspect of the present invention;

FIG. 23 illustrates steps of a method provided in accordance with one or more aspects of the present invention;

FIG. 24 illustrates a multi-processor device provided in accordance with one or more aspects of the present invention;

FIGS. 35-40 are screenshots generated by a computing device implementing one or more aspects of the present invention;

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 1:
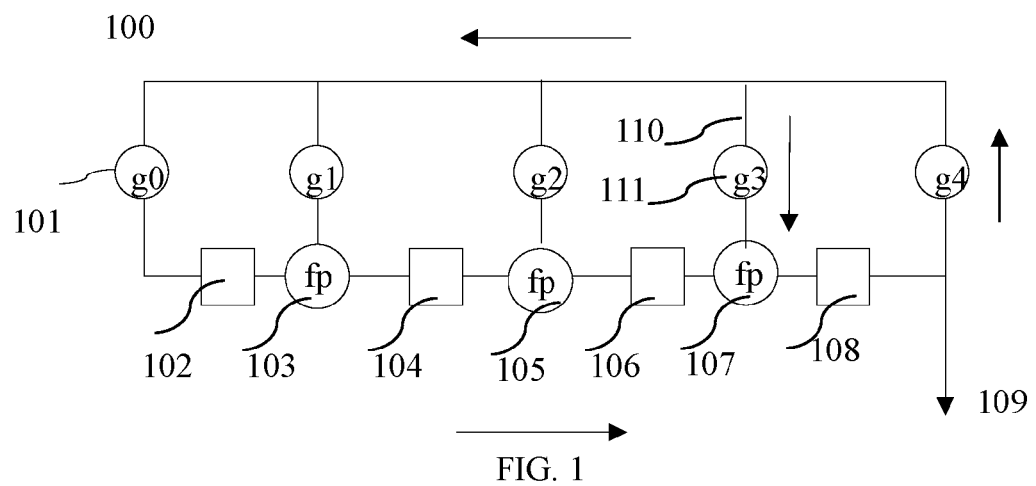
FIGS. 1-2 are examples of n-state LFSRs in Galois and Fibonacci configuration with n equal to or greater than 2.

Shift registers are provided with feedback from at least an output of a last shift register element in a shift register to an input of a first shift register element. The symbols outputted on the last shift register element are further modified before inputted to a different shift register element. In general two types of feedback shifts register configurations are recognized. The first type is the Galois configuration as illustrated in FIG. 1. The shift register device 100 has 4 shift register elements, 102, 104, 106 and 108, respectively. The shift register elements each hold a content and provide on an output the content until a signal, usually a clock signal is provided. At that time a shift register accepts the symbol provided at its input and shifts the new input into its memory and provides the new content on the output. In the Galois configuration at least two adjacent shift register elements are connected through a switching function.

FIG. 1 illustrates how each set of adjacent shift register elements is connected through a switching function 'fp' indicated as 103, 105 and 107, respectively. In prior art fp is in the binary case usually the XOR function and in nonbinary embodiments an addition over a finite field GF(n) with n>2. When n is a power of 2, the function 'fp' generally is an addition of GF(n) formed from a multiple of XOR functions. However, this is not required. In the binary case 'fp' may be also the EQUAL ("=") function and in the nonbinary case 'fp' may be any, usually reversible, switching function.

A connection in the feedback loop in FIG. 1 from shift register element 108 to shift register element 102 to a switching function 'fp' is called a tap. Tap 110 is identified going to function 107 which connects also 106 and 108. A symbol may be modified by an inverter 111 in this tap. The different inverters are identified as g0, g1, g2, g3 and g4. Inverter g3 is also identified as 111 and inverter g0 is identified as inverter 101. The n-state switching functions 'fp' are identified by an n by n matrix which shows an output state as a result of 2 input states. The switching or logic function representation of the XOR function, and of binary switching functions are well known.

An example of a 4-state switching function, being an addition over GF(4) is provided below.

| GF4add | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

In general, a binary inverter is assumed to be the inverter $[0\ 1] \rightarrow [1\ 0]$. In this notation the state in a position in the vector before the arrow is transformed into the state shown in the vector after the arrow. So, symbol 0 in the first position in the vector before the arrow is transformed into the symbol 1 being the first symbol in the vector after the arrow. Input symbol 1 is transformed into 0. Herein an n-state inverter is any possible transformation in the state space. The possible binary transformations are: $[0\ 1] \rightarrow [1\ 0]$ (the conventional inversion); $[0\ 1] \rightarrow [0\ 1]$ (identity); $[0\ 1] \rightarrow [0\ 0]$ (always off); and $[0\ 1] \rightarrow [1\ 1]$ (always on). An n-state logic has $n^n$ inverters of which n! (factorial) are reversible. Binary logic has 4 inverters of which 2 are reversible (the XOR and the EQUAL). A 4-state logic has $4^4 = 256$ inverters of which $4! = 1*2*3*4 = 24$ are reversible. One reversible 4-state inverter is the inverter $[0123] \rightarrow [3210]$. Because the n-state vector before the arrow always displays the vector $[012 \ldots (n-1)]$ it will usually be dropped and the example 4-state inverter will be identifies as $[3\ 2\ 1\ 0]$.

It is known that feedback shift registers with k shift register elements can be used to represent an n-state polynomial of degree k over a final field GF(n). In that case the operations in the polynomial are the addition and the multiplication over GF(n). For example, FIG. 1 may represent a polynomial of degree 4. The last element in the polynomial is usually 1, so g4 would be identity. In the binary case the terms g0, g1, g2 and g3 are usually the terms 0 and 1 or the inverters $[0\ 0]$ and $[0\ 1]$.

In the nonbinary case the terms are commonly multiplications in the finite field GF(n). A multiplication over GF(4) is determined by:

| GF4* | 0 | 1 | 2 | 3 |
|------|---|---|---|---|
| 0    | 0 | 0 | 0 | 0 |
| 1    | 0 | 1 | 2 | 3 |
| 2    | 0 | 2 | 3 | 1 |
| 3    | 0 | 3 | 1 | 2 |

The multiplications are the 4-state inverters $[0\ 0\ 0\ 0]$ (always off); $[0\ 1\ 2\ 3]$ (identity) and $[0\ 2\ 3\ 1]$ and $[0\ 3\ 1\ 2]$.

An output symbol is provided on output 109. Based on the structure or configuration of the feedback, the circuit 100 is a sequence generator that is able to generate $n^4 - 1$ different contents of the shift register. In general, the content $[0\ 0\ 0\ 0]$ is not generated and is called a forbidden state herein. A sequence of $n^4 - 1$ n-state symbols is generated on 109 after which the content of the shift register is repeated. The sequence is then called a Maximum Length (ML) n-state sequence.

An n-state k-stage Maximum Length sequence generator in general can have $n^k - 1$ different shift register contents in the k shift register elements. The shift register of FIG. 1 is a state machine of which a next state is determined by the current state. In order to generate an ML sequence it is required that no complete states of the shift register are repeated, because from that moment the generator will start to repeat itself. The state or content $[0\ 0\ 0\ 0\ 0]$ is forbidden as in that state the next state will also be $[0\ 0\ 0\ 0\ 0]$ and so on. One may call $[0\ 0\ 0\ 0\ 0]$ also a degenerated state or a singular state. From a device perspective there is nothing special about $[0\ 0\ 0\ 0\ 0]$ as content. It merely will perpetuate that state. The forbidden state is not unstable and the generator will operate in a normal way. However, the $[0\ 0\ 0\ 0\ 0]$ state is generally not very useful.

It is further noted that $[0\ 0\ 0\ 0\ 0]$ is not included in the shift register contents that are being generated, generally. This is a telltale on the possible structure of the shift register device that may not be desirable in some situations.

The structure of FIG. 1 is generally called a Galois configuration, wherein the 2-input single output functions are located between the shift register elements. This is a fast shift register configuration in the sense that all functions switch at the same time and one does not have to wait for the individual switching results. The inverters which first have to provide an output before the switching function fp can be executed may add to a delay. However, the inventor has shown how for the nonbinary case the switching table of fp can be modified in accordance with an inverter at the input. That is, one may reduce the switching table of the inverter and the function fp to which it is connected into a single modified switching table. This reduces or eliminates any waiting time for executing the switching function.

Figure 2:
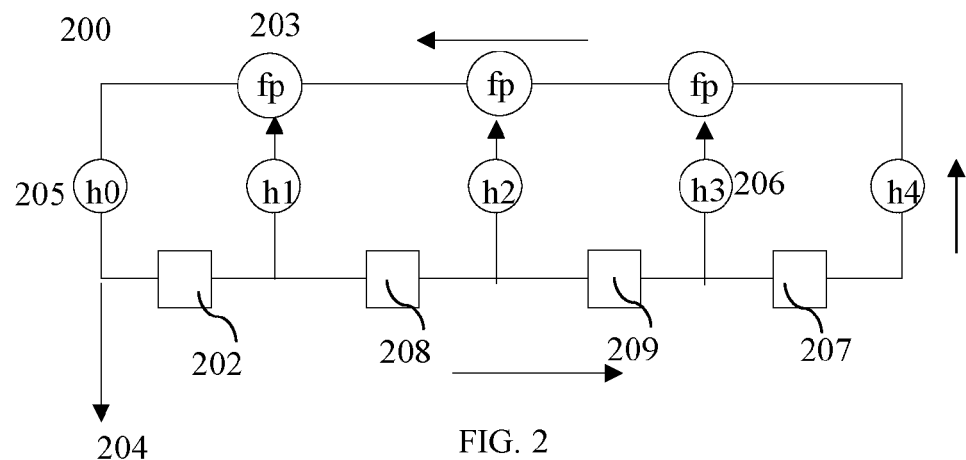

FIG. 2 shows the other known shift register with feedback configuration 200, which is called the Fibonacci configuration. The shift register has elements 202, 208, 209 and 207, which each can hold a binary or nonbinary symbol. The feedback takes place outside the shift register. The feedback loop in this example is formed by the functions fp, which may be binary or non-binary switching functions and of which one is identified as 203. The functions get their input from the shift register elements, via inverters in the taps of which 205 and 206 are identified. A sequence of n-state symbols, with n being 2 or greater, is provided on an output 204. In general the function fp is a switching function that is am addition over GF(n) with n being 2 or greater. The shift register is often represented as a polynomial of degree k with coefficients h0, h1, h2, h3 and h4. In general either h0 or h4 is 1. Because the polynomial is represented over GF(n), the coefficients are multiplications over GF(n), which can be represented as inverters.

The Fibonacci configuration has several important aspects. The first aspect is that a signal (or symbol) works its way from the output of the last shift register element to the first one via the switching functions in the feedback loop. In the example of FIG. 2 it means that before the symbols can be shifted there is a delay of at least three times the delay of the switching function. One is reminded that the shift register is a physical device and that signals have to work their way through the elements of the feedback shift register.

The other aspect is that the symbols once they enter the shift register remain unmodified until they are shifted out of the last shift register element. This is different from the Galois configuration, wherein after a shift the content is the succeeding shift register element has been modified by an intervening logic function.

In general one designates the shift register devices with feedback in FIGS. 1 and 2 as Linear Feedback Shift Registers (LFSRs) when the functions that are applied, such as fp, are strictly linear functions such as the binary XOR function.

Non-linear Feedback Shift Registers (NLFSRs) have been proposed as an alternative to LFSRs as being potentially more secure and not as prone to cryptanalysis as LFSRs. See for instance On Analysis and Synthesis of (n,k)-Non-Linear Feedback Shift Registers by Alena Dubrova et al. (Dec. 7, 2007, published on-line at http://www.date-conference.com/proceedings/PAPERS/2008/DATE08/PDFFILES/10.4_3.PDF and which is incorporated herein by reference. Another article entitled A List of Maximum Period NLFSRs by Elena Dubrova, Royal Institute of Technology (KTH), Forum 120, 164 40 Kista, Sweden, 9 pages, March 2012, is incorporated herein by reference.

As NLFSRs are more readily available, and cryptanalysis is performed on more powerful computers, other ways to apply sequences are required to secure data.

An LFSR can be a binary LFSR wherein a shift register element can hold a binary symbol, the binary symbol being represented by a binary signal. An LFSR can be a non-binary LFSR, wherein a shift register element can hold a non-binary symbol; a non-binary symbol having one of n states with n>2. A single non-binary symbol can be represented by a signal. In one embodiment such a signal representing a non-binary symbol can be a single non-binary signal able to have one of n states. A non-binary symbol in another embodiment can be represented by a plurality of signals, for instance, by a plurality of binary signals. For instance, an 8-state symbol can be represented by a word of 3 bits, each bit being represented by a binary signal.

A binary or n-state LFSR can be in Fibonacci or in Galois configuration. In general devices such as LFSRs, NLFSRs or NFSRS either in Galois or in Fibonacci configuration will be designated as shift register based devices. Most common nowadays are binary shift register based devices that apply shift registers that can hold and shift binary signals, represented by binary symbols or bits. The processing of the binary signals takes place by binary switching devices of which the switching behavior is characterized by binary switching functions such as 2 input single output binary switching or logic functions and single input single output binary functions also known as inverters.

Of interest are also nonbinary shift register based devices. These devices have shift register elements that can hold and shift signals that are characterized by nonbinary symbols that can have one of n states with n greater than 2. For instance a 4-state symbol can have one of 4 states, such as 90, 1, 2 and 3). The signals of which the n-state symbols are a representation can be single n-state signals. As an example a 4-state symbol can represent one of 4-state voltages, being 0 Volt, 0.5 Volt, 1.5 Volt and 2.5 Volt. A 4-state signal may also be a representation of other physical phenomena such as a wavelength or color of light. 0 represents no light, 1 represents 400 nm, 2 represents 600 nm and 3 represents 800 nm. These are merely examples to illustrate the existence of different type of signals that can be represented by an n-state symbol. N-state symbols may even represent different physical phenomena, 0 is no phenomenon, 1 is electrical, 2 is light and 3 is a presence of a material.

A series of signals that are stored and processed as words or packets may also be represented by an n-state symbol. For instance a combination of 2 binary signals may be represented by a 4-state symbol.

In many applications, including in scrambling and descrambling and in spread-spectrum modulation a sequence of n-state symbols with n≥2 and n>2, some knowledge is required about a phase or synchronization of a sequence that was transmitted from a transmitter in order to be detected or decoded at a receiver. In the instant application, an n-state sequence is assumed to be associated with an n-state LFSR. In some cases one wants to know how a phase or synchronization point of a received sequence relates to an initial state of a sequence generator. In other cases one would like to start generating in parallel to a received sequence a sequence that is synchronized with the received sequence.

In general one applies one or more transition matrices to determine a state of an LFSR compared to a known state or to initiate an LFSR. Such calculations can be quite extensive and time consuming. Accordingly, novel and improved methods and apparatus are required to determine a desired state of an n-state LFSR with n≥2 or n>2.

The inventor has described in earlier patent applications how after determining an error location in a codeword one can determine the correct symbol value without first determining an error magnitude. Also described in earlier patent applications is the up-and-down down approach in determining intermediate coding states. These aspects are described in U.S. Provisional Patent Application No. 60/807,087, filed Jul. 12, 2006, and U.S. Provisional Patent Application No. 60/821,980 filed Aug. 10, 2006 which are both incorporated herein by reference in their entirety. U.S. patent application Ser. No. 11/739,189 filed Apr. 26, 2007 and U.S. patent application Ser. No. 11/743,893 filed May 3, 2007 and U.S. patent application Ser. No. 11/775,963 filed on Jul. 11, 2007 are also incorporated herein by reference in their entirety.

Sequences of n-state symbols can be generated by linear feedback shift registers (LFSRs). The LFSR can be used in an autonomous configuration, working off a clock signal starting at an initial setting of the shift register. The LFSR associated sequence generator can be in Galois configuration as shown in FIG. 1. The generator 100 has a 4 element shift register of which first element 102 and last element 105 are identified, each element is able to hold and shift one n-state symbol (with n≥2). At least two adjacent shift register elements are connected through a device 103 that implements a two-input single output n-state switching function fp. In general, when n=2 (or in binary implementations) fp is the binary XOR function though the EQUAL can also serve that purpose. A multiplier for n=2 is the binary AND function, though for instance the NAND function can also serve that purpose. The truth tables of the XOR and AND are provided below.

| XOR | | | AND | | |
|---|---|---|---|---|---|
| | 0 | 1 | | 0 | 1 |
| 0 | 0 | 1 | 0 | 0 | 0 |
| 1 | 1 | 0 | 1 | 0 | 1 |

For n>2 fp can be any n-state reversible 2-input single output n-state switching function. For instance fp is an adder over GF(n). (wherein GF stands for Galois Field or Finite Field).

For many applications it is beneficial when the sequence generator provides for instance on an output 104 a maximum length or m-sequence. Such a pseudo-random sequence has $n^4-1$ n-state symbol. The length of an n-state sequence depends on the number of shift register elements. When the LFSR has p shift register elements the maximum length is $n^p-1$ n-state symbols. Feed-back loops are created through n-state inverters g0, g1, g2, g3 and g4 of which g0 is identified as 101. In general the applied inverters are multipliers over GF(n). The inverter has shown, for instance, in U.S. Pat. No. 7,487,194 issued on Feb. 3, 2009 and which is incorporated herein by reference that also n-state inverters not being multipliers over GF(n) can be applied.

One way to determine if a sequence of n-state symbols is maximum length is by determining the auto-correlation graph of a sequence of $n^p-1$ n-state symbols. When the sequence is maximum length the autocorrelation graph of such sequence is substantially flat with at least one peak. The inventor has shown in, for instance, U.S. Pat. No. 7,580,472 issued on Aug. 25, 2009, which is incorporated herein by reference, that by only adding a fixed value to a sum when two n-state symbols in sequences that are correlated are identical (and if desired subtracting a fixed value if two n-state symbols are different) that also for n>2 the auto-correlation graph of n-state m-sequences has only one peak.

One can create different 4-stage n-state sequence generators that will generate n-state m-sequences. The inverters g0 and g4 always have to be an inverter not being the multiplier-0 inverter. In the binary case the binary configuration [g0 g1 g2 g3 g4]=[1 0 0 1 1] of FIG. 1 can generate a binary m-sequence of 15 binary symbols. In one case fp is the binary XOR function. In the 8-state case the 8-state configuration [g0 g1 g2 g3 g4]=[4 2 1 2 1] of FIG. 1 can generate an 8-state sequence of 4095 of 8-state symbols. The inverters herein are multipliers over GF(8) and fp is an addition over GF(8).

The following truth tables define the addition and multiplication over GF(8).

The following truth tables describe the 8-state function fp being an adder over GF(8).

| c | | | | | b | | | | |
|---|---|---|---|---|---|---|---|---|---|
| | fp | 0 | 1 | 2 | 3 | 4 | 5 | 6 | 7 |
| | 0 | 0 | 1 | 2 | 3 | 4 | 5 | 6 | 7 |
| | 1 | 1 | 0 | 4 | 7 | 2 | 6 | 5 | 3 |
| a | 2 | 2 | 4 | 0 | 5 | 1 | 3 | 7 | 6 |
| | 3 | 3 | 7 | 5 | 0 | 6 | 2 | 4 | 1 |
| | 4 | 4 | 2 | 1 | 6 | 0 | 7 | 3 | 5 |
| | 5 | 5 | 6 | 3 | 2 | 7 | 0 | 1 | 4 |
| | 6 | 6 | 5 | 7 | 4 | 3 | 1 | 0 | 2 |
| | 7 | 7 | 3 | 6 | 1 | 5 | 4 | 2 | 0 |

The truth table of the multiplication m8 over GF(8) is provided in the following truth table.

| c | | | | | b | | | | |
|---|---|---|---|---|---|---|---|---|---|
| | m8 | 0 | 1 | 2 | 3 | 4 | 5 | 6 | 7 |
| | 0 | 0 | 0 | 0 | 0 | 0 | 0 | 0 | 0 |
| | 1 | 0 | 1 | 2 | 3 | 4 | 5 | 6 | 7 |
| a | 2 | 0 | 2 | 3 | 4 | 5 | 6 | 7 | 1 |
| | 3 | 0 | 3 | 4 | 5 | 6 | 7 | 1 | 2 |
| | 4 | 0 | 4 | 5 | 6 | 7 | 1 | 2 | 3 |
| | 5 | 0 | 5 | 6 | 7 | 1 | 2 | 3 | 4 |
| | 6 | 0 | 6 | 7 | 1 | 2 | 3 | 4 | 5 |
| | 7 | 0 | 7 | 1 | 2 | 3 | 4 | 5 | 6 |

It should be clear that the herein provided generators are illustrative examples only. One may create generators for any value of n≥2 and for any LFSR with p shift register elements with p≥2.

Nonlinear Sequence Generators

Figure 3:
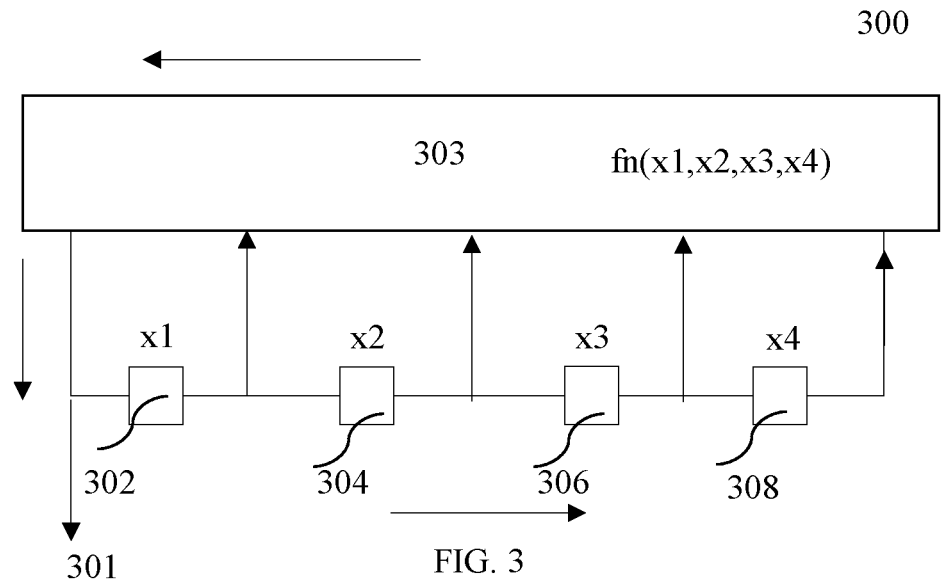
FIG. 3 is a diagram of an n-state shift register with feedback operating autonomously under a clock signal.

FIG. 3 illustrates a generic n-state, binary and non-binary, sequence generator 300 in Fibonacci configuration. For illustrative purposes, the size of the n-state shift register is limited to 4 elements. However, the aspects of the present invention provided herein apply for any size of a k elements n-state shift register with n and k both being at least 2. Identified are shift register elements 302, 304, 306 and 308, each enabled to hold and shift an n-state symbol, an n-state symbol being in actuality one or more signals. The feedback circuit 303 takes inputs from the shift register elements, represented as x1, x2, x3 and x4. The circuit 303 performs n-state logic function(s) fn(x1,x2,x3,x4). Circuit 303 performs a switching function either by combinatorial circuitry, memory elements or a combination thereof. In order to complete switching in 303 a sufficient delay is required to generate an output n-state symbol on 301 before the contents of the shift register elements are shifted. The circuit of FIG. 3 shows that all shift register elements provide an input into 303. This does not mean that all symbols have to contribute to the feedback. For instance assume that FIG. 3 represents a binary shift register with a structure as in FIG. 2 with h0=1, h1=0, h2=0, h3=1 and h4=1, wherein 1 represents the identity and 0 represents an open connection. The function fp is the binary XOR or mod-2 add function indicated by '+'. The function fn(x1,x2,x3,x4) is then f2=x3+x4, which is a linear function.

In a 4-state case, h0=2, h1=0, h2=3, h3=2 and h4=1, wherein these factors are multipliers over GF(4) and are implemented as 4-state inverters. The function fp is a 4-state addition over GF(4), also represented by '+' and the feedback function is linear and is f4=2*(3x2+2x3+x4).

Figure 4:
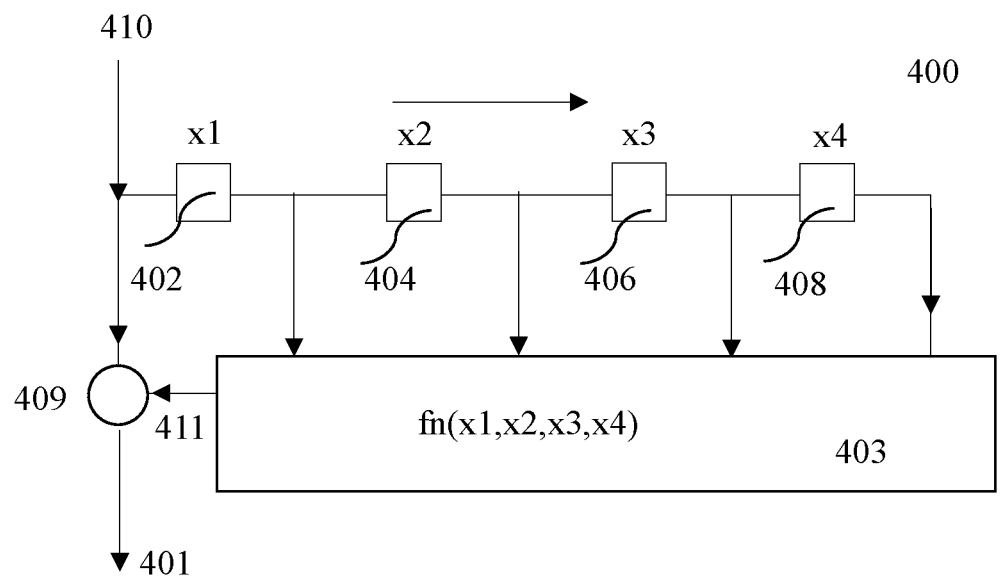
FIG. 4 illustrate in diagram an n-state shift register symbol detector with feedback provided in accordance with an aspect of the present invention.

FIG. 4 illustrates a generic sequence detector 400 that corresponds to the sequence generator 300 of FIG. 3. It contains the same number of shift register elements as in FIG. 3, now called 402, 404, 406 and 408 with feedback circuit 403 fn(x1,x2,x3,x4) which is identical to the circuit 303. The feedback circuit has an output 411, which is an input on switching function 409. The sequence generated on output 301 in FIG. 3 is provided on input 410 in FIG. 4 and shifted into the shift register and provided on the switching function 409. The result of the switching function 409 is provided on output 401. The switching function 409, be it binary or non-binary, should only output a specific signal when the symbols on 410 and 411 are identical. In general 410 and 411 provide identical symbols, due to the structure of generator 300 in FIG. 3. The content of 402, 404, 406, 408 eventually will be identical to the content of 302, 304, 306 and 308. Even when the shift register of FIG. 4 starts with a different content than 300, after 4 clock cycles the shift register of FIG. 4 is flushed and becomes synchronous with the shift register of FIG. 3. After any required flushing, the output of 409 is a stream of symbols that indicates that 410 and 411 contain exactly the same symbols.

Preferably, the output of 409 provides an n-state symbol that only appears if 410 and 411 are identical. This may be the symbol 0 for instance. If 410 and 411 are different then a symbol not being 0 is generated. This choice is especially advantageous if 0 is represented by an absence of signal. However, other choices can be made. For instance only a 1 is generated when symbols in 410 and 411 are identical and a 0 is generated when symbols on the inputs are not identical.

There are many variants on this. For instance in the 4-state case a 0 is generated when symbols on 410 and 411 are identical and any other 4-state symbol is generated when symbols are not identical. Such a function is for instance the addition over GF(4). In another example in the 4-state case any 4-state symbols not 0 is generated when the symbols on the inputs are identical and a 0 is generated when symbols are not identical.

The structure of FIG. 4 also has as a consequence that when 403 is not the same as 303, then 401 will not provide symbols that indicate identical symbols on 410 and 411. Clearly, one has to monitor 401 for at least k+1 and preferably 2 k or 3 k clock cycles before deciding that the generated sequence on 401 indicates identical symbols on the inputs, with k the number of shift register elements. When 300 and 400 have a different number of shift register elements the output on 401 also will not indicate that symbols on the inputs 410 and 411 were identical.

If the sequence generator of FIG. 3 and the detector of FIG. 4 correspond in size, structure and feedback circuitry with a function 409 as described above, output 401 will generate a sequence that indicates identical symbols. This does not depend on the fact if the sequence generator generates a Maximum Length sequence or not.

Another, unexpected aspect or result, is that the correct working of the detector does not depend on the function fn being linear or not. In fact, the detector works just fine with non-linear functions, both binary and non-binary. In addition one may also apply non-linear functions that are not associative. Non-commutative binary and non-binary switching functions are non-associative.

Figure 5:
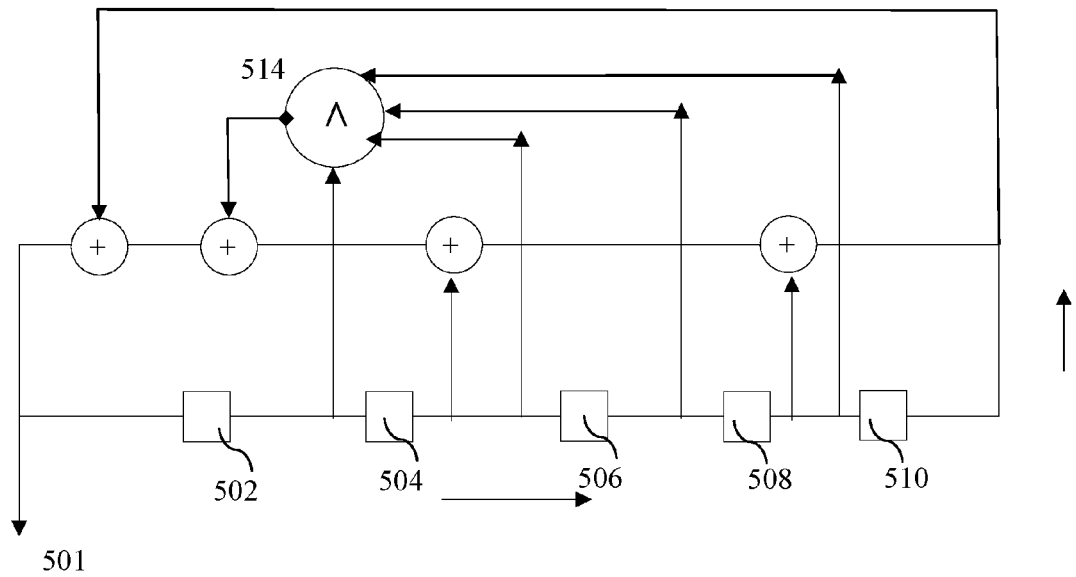
FIGS. 5-6 illustrate a sequence generator and a corresponding detector provided in accordance with an aspect of the present invention.

An illustrative example of a binary shift register based sequence generator using a binary non-linear function is provided in FIG. 5 and may be called a Nonlinear Feedback Shift Register (NFSR or NLFSR). It shows a 5-element shift register with elements 502, 504, 506, 508 and 510. The '+' function is a device implementing the binary XOR switching function. Function 514 is the 'AND' function that is also indicated as '∧.' It is popular in the known literature to represent the AND function as the modulo-2 multiplication '.'. This is confusing, because a switching function represents a physical switching device which performs merely a change of state. The multiplication is read into this switching as a meaning in hindsight. In reality, the device 514 does not multiply but merely switches.

Illustrative embodiments of the present invention are modified devices that generate the Trivium code as explained in DE CANNIERE ET AL, Trivium Specifications, date unknown, 7 pages, Katholieke Universiteit Leuven, Dept. ESAT/SCD-COSIC, Kasteelpark Arenberg 10, B-3001 Heverlee, Belgium, downloaded from <www.ecrypt.eu.org/stream/p3ciphers/trivium/trivium_p3.pdf> which is incorporated by reference herein. The TRIVIUM coder applies a plurality of AND functions to generate the code signals. In accordance with an aspect of the present invention in the TRIVIUM coder at least one AND function is replaced by a non-commutative binary function. In accordance with an aspect of the present invention in the TRIVIUM coder at least more than one AND function is replaced by a non-commutative binary function. In accordance with an aspect of the present invention in the TRIVIUM coder at least one AND function is replaced by a non-associative binary function not being a NOR function. In accordance with an aspect of the present invention in the TRIVIUM coder at least two AND functions are replaced by NAND functions. In accordance with an aspect of the present invention in the TRIVIUM coder at least two AND functions are replaced by a NAND and a NOR function. The above applies to any stream cipher that applies a rotated updating as illustrated in FIG. 1 of the Trivium specification. The above applies also to any stream cipher that applies a NLFSR.

Figure 6:
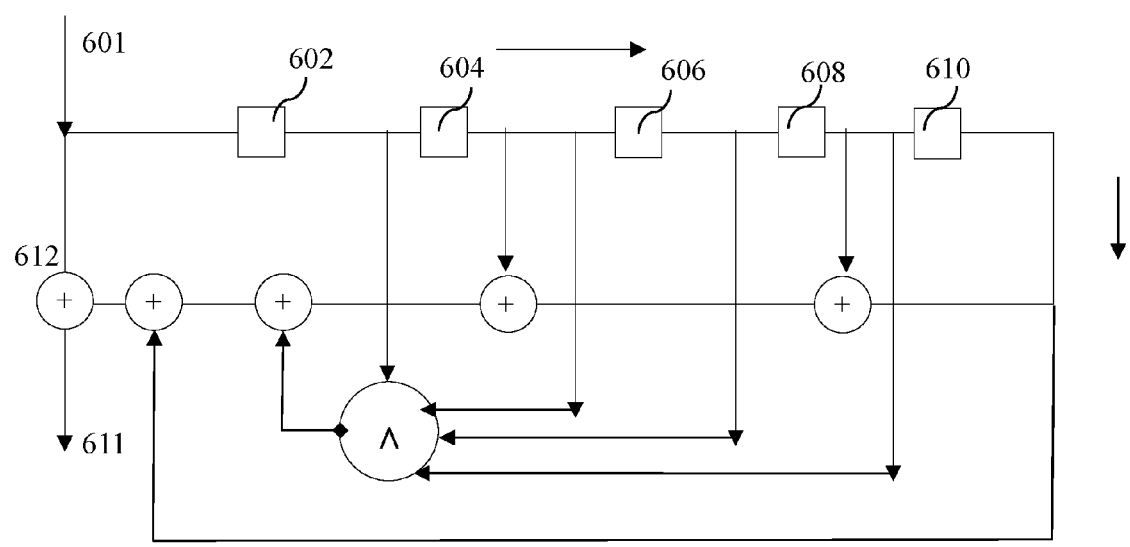
Figure 7:
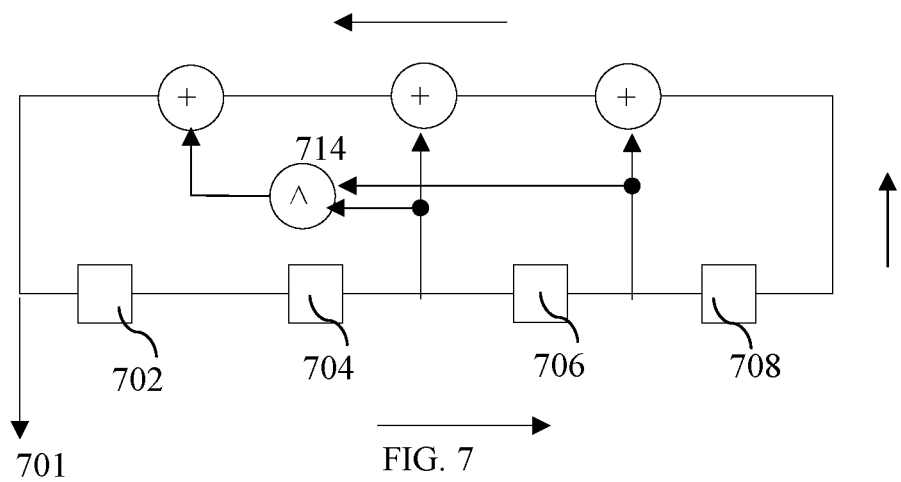
FIGS. 7-8 illustrate a sequence generator and a corresponding detector provided in accordance with an aspect of the present invention.

The generator of FIG. 5 was disclosed in FIG. 7 in U.S. Pat. No. 3,911,330 issued to Fletcher et. al on Oct. 7, 1975 which is incorporated herein by reference in its entirety. While the generator looks complicated, it is simple to implement on Matlab® to generate a 31 binary symbol sequence. It turns out that the sequence thus generated is not maximum length. What is not disclosed in Fletcher, and what is believed to be novel, is the corresponding detector as illustrated in FIG. 6 with shift register elements 602, 604, 606, 608 and 610. The structure of the detector is almost identical to the generator of FIG. 5 with the differences that an input 601 connected to the input of the shift register and to an input of a detecting device 612 that in this case is an XOR switching device. Another input of detecting device 612 receives the output of the feedback circuit. The output of the detecting device is 611. When the sequence outputted on 501 is provided on 601 then 611 will generate all 0s at least after 5 symbols and only 0s if the initial state of the shift register of FIG. 6 was identical to the initial state of the shift register of FIG. 5. Accordingly, FIG. 6 illustrates a nonlinear sequence detector.

Figure 8:
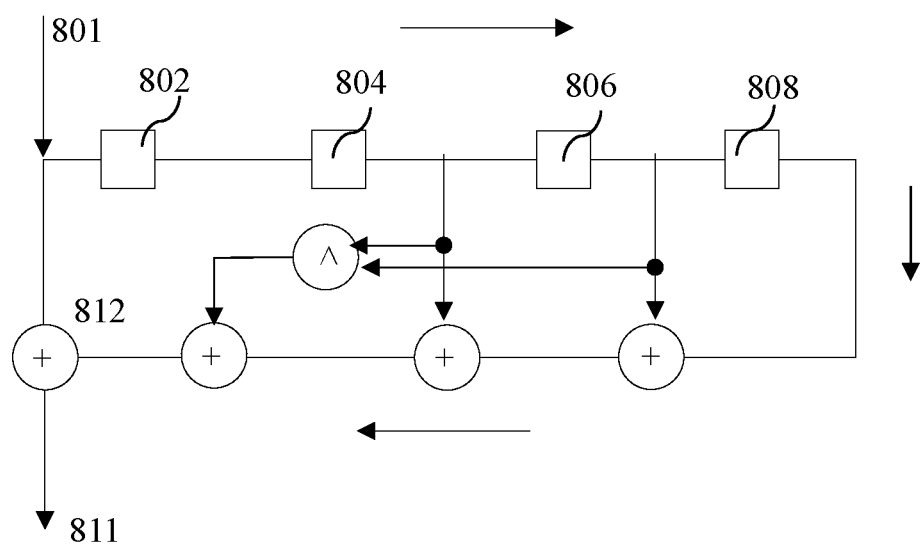

Another example of a binary NLFSR is provided in FIG. 7 with shift register elements 702, 704, 706 and 708 and with one nonlinear device 714 that implements an AND switching function. A sequence of binary symbols is provided on output 701. This sequence generator is disclosed in the online article "A List of Maximum Period NLFSRs" by Elena Dubrova, published Mar. 27, 2012 at <http://eprint.iacr.org/2012/166.pdf>. The corresponding detector provided in accordance with an aspect of the present invention is illustrated in FIG. 8 with shift register elements 802, 804, 806 and 808 with the same structure as FIG. 7 with an input 801 added that receives a sequence and a detecting element 812 implementing an XOR switching function that provides a sequence of symbols on output 811. If the sequence of 701 is provided on 801 then 811 will generate a sequence of all 0s at least after flushing the shift register or all 0s if the initial states of the shift register of FIGS. 7 and 8 were identical. In any other case the sequence on 811 will not be all 0. An exception is if one puts all 0 sequences on 801.

A novel aspect of the present invention is to use devices in sequence generators that implement switching functions that are not associative. As a reminder, a function is associative when there is no preferred order of execution and for instance (a ⊛ b) ⊛ c=(a ⊛ c) ⊛ b=(c ⊛ b) ⊛ a, wherein ⊛ represents an operator of the function. Clearly the classical * and + operator are associative, and the '−' operator is not. For the binary logic operators, it is known that XOR, EQUAL, AND and OR are associative. For that reason, one can represent the sequence generator of FIG. 5 with device 514 which is shown as an AND device with 4 inputs. In reality one has to probably use several two-input devices. However, no matter how these AND circuits are arranged they will provide the same output signal with the inputs as required.

Figure 9:
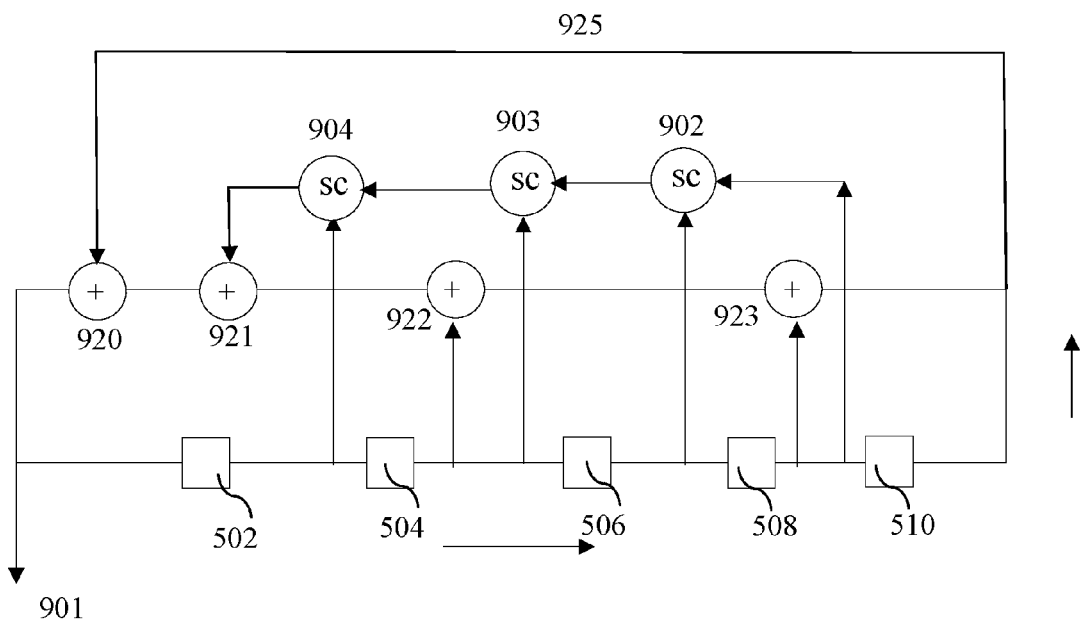
FIGS. 9-10 illustrate sequence generators provided in accordance with an aspect of the present invention.
Figure 10:
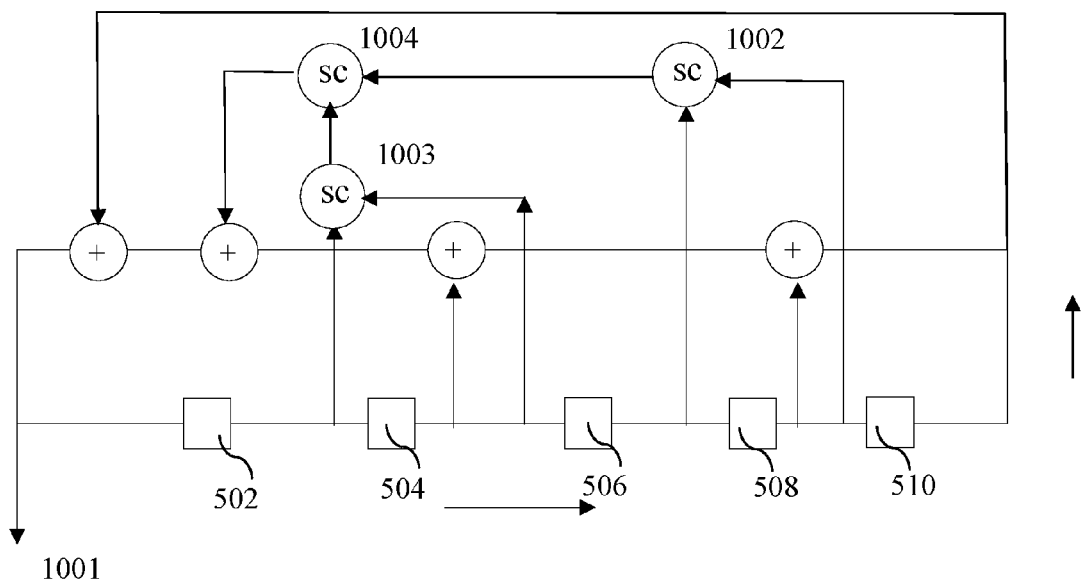

FIG. 9 illustrates a configuration wherein the AND is replaced by the NOR (NOT OR) function, named 'sc' in FIGS. 9 and 10 with the following truth table:

| sc | 0 | 1 |
| --- | --- | --- |
| 0 | 1 | 0 |
| 1 | 0 | 0 |

This function is not associative and thus the order of inputs will make a difference. The arrangement of FIG. 9 has the same shift register as in FIG. 7 and the same XOR functions, but now has three devices implementing 'sc' in 902, 903 and 904. These used to be combined in one single 4-input AND function in FIG. 7. However, that is not allowed in FIG. 9 because the function 'sc' is not associative. The functions 'sc' will be executed in the order 902, 903 and 904. The sequence of symbols will be outputted on output 901. One such sequence is of 31 bits [1 1 1 0 1 0 0 1 1 0 0 1 0 1 0 1 1 0 1 1 1 0 1 0 0 1 1 0 0 1 0] with initial shift register [0 1 1 0 1].

FIG. 10 illustrates yet another implementation using a similar structure as in FIG. 7 but now with devices 1002, 1003 and 1004 that implement function 'sc'. In this structure devices 1002 and 1003 operate independently and the output of both is inputted on 1004. A sequence is generated on output 1001. One such sequence is of 31 bits [1 0 0 1 0 0 0

1 1 1 0 1 1 0 1 0 0 1 0 0 0 1 1 1 0 1 1 0 1 0 0] with initial shift register [0 1 1 0 1]. Thus, even though the initial contents of the shift registers of FIGS. 9 and 10 are identical, the output sequences are different.

One can create detectors as discussed before with non-associative switching functions, taking in account the correct structure of the switching devices. Accordingly, binary NLFSRs are provided in accordance with an aspect of the present invention that contain at least one and preferably two non-associative switching functions.

Novel sequence generators and sequence detectors in Fibonacci configuration have been provided above, in accordance with various aspects of the present invention. One advantage of the Fibonacci configuration detector is that errors or initial mismatches will be flushed from the shift register after which the detector will correctly correct a sequence. Increased security may be obtained with Galois configurations, as errors, for instance due to mismatch in an initial shift register content, will propagate throughout the processing cycle and will not be flushed. An illustrative example of a binary sequence generator in Galois configuration and containing at least two non-linear functions that are non-associative is provided in FIG. 11. The generator has 6 register elements and is in Galois configuration with 4 XOR function in the shift register path. There are also 3 functions 'sc' of which a result is combined through a XOR function with the feedback loop back into the shift register and on output 1101. The output 1101 generates [1 0 0 0 0 1 0 1 1 0 0 1 0 1 0 1 0 0 1 0 0 1 1 1 1 0 0 0 0 0 1 1 0 1 1 1 0 0 1 1 0 0 0 1 1 1 0 1 0 1 1 1 1 1 1 0 1 1 0 1 0 0 0] with initial shift register state [0 1 1 0 1 0].

The function 'sc' in this case is provided by the following truth table:

| sc | 0 | 1 |
|---|---|---|
| 0 | 1 | 1 |
| 1 | 1 | 0 |

The function is the NAND function, which is non associative.

Figure 11:
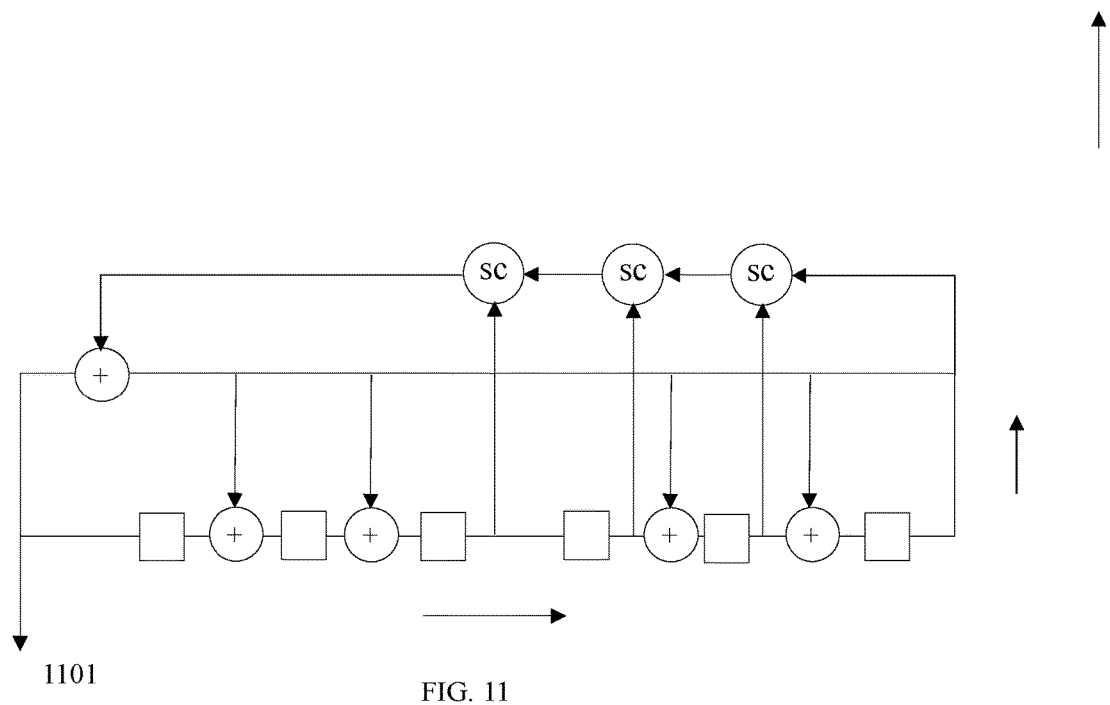
FIGS. 11-12 illustrate a sequence generator and a corresponding detector provided in accordance with an aspect of the present invention.
Figure 12:
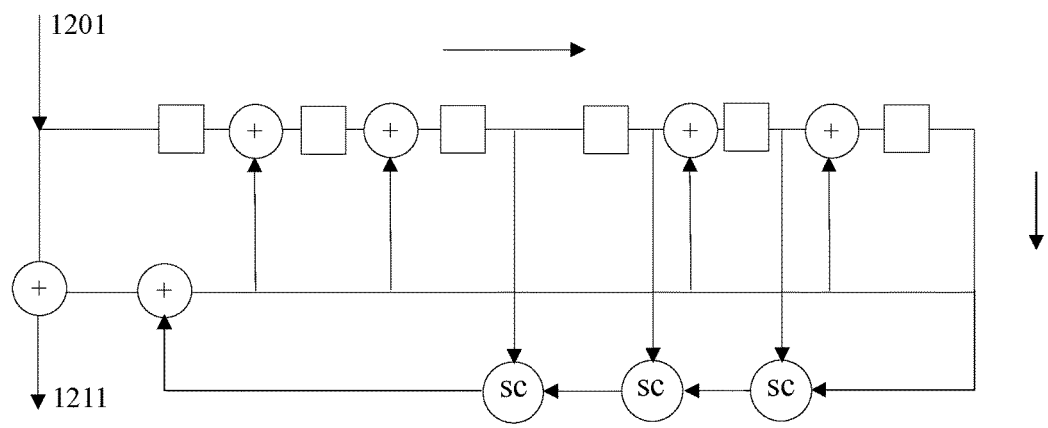

The corresponding detector of FIG. 11 is shown in diagram in FIG. 12. When the output sequence on input 1201 is identical to the output of 1101 and the initial content of the shift registers of FIGS. 11 and 12 are identical, then 1211 will produce a sequence of all 0s. If the initial contents of the generator and detector shift registers are not identical then not an all 0 sequence will be generated on 1211.

The linearity of Boolean or machine logic functions of two or more variables is generally decided by the Reed-Muller expansion of the function. Clearly the XOR function meets the Reed-Muller expansion requirement. In non-binary machine logic this becomes more uncertain, if one adheres to the Reed-Muller expansion requirement. N-machine logic functions over $GF(n=2^k)$ created by binary XOR functions such as the addition over GF(n) may be considered being linear.

It is further noted that NLFSRs are considered being more unconventional than LFSRs for purposes of sequence generation and hash functions. Rather than focusing on linearity, one should probably focus on conventionality of non-binary shift registers with feedback. It is conventional to express or represent shift registers in polynomial representation over a finite field GF(n). In the non-binary case the polynomials are expressed in addition of terms with coefficients that are multipliers over a finite field GF(n) and that are added with an addition over GF(n). Conventionally, the coefficients can be 0 or non-zero. The 0 in the finite field is also the zero-element of the field so that 0*x=0 and 0+x=x for each element x in the finite field. Non-conventional non-binary shift registers with feedback are thus n-state shift registers with at least one n-state feedback function that renders the shift register unable to be conventionally described by a polynomial over a conventional finite field GF(n) with n>2 and n being an integer.

A finite field is defined by its symbols and addition and multiplication of the symbol and its neutral and 0 element. Binary extension fields $GF(n=2^k)$ are known, wherein the n-state symbols are formed by words of k bits and addition of the n-state symbols can be performed by XORing the individual bits in the words that represent them. One distinguishing feature of these additions is that addition of identical symbols generates a 0 symbol. Finite fields GF(n) with n being prime are formed by the modulo-n addition and the modulo-n multiplication. Maximum length n-state generating shift registers with k register elements with feedback generating $n^k-1$ n-state symbols are represented by primitive n-state polynomials of degree k: $g(X)=g0+g1*X+g2*X^2+ \ldots +gk*X^k$. The coefficients gk are multiplications over GF(n). The primitive polynomials commonly have at least one coefficient not being 0 or 1.

A 3-State Example

The following truth tables are the addition and multiplication over GF(3).

| GF3+ | 0 | 1 | 2 |
|---|---|---|---|
| 0 | 0 | 1 | 2 |
| 1 | 1 | 2 | 0 |
| 2 | 2 | 0 | 1 |

| GF3 * | 0 | 1 | 2 |
|---|---|---|---|
| 0 | 0 | 0 | 0 |
| 1 | 0 | 1 | 2 |
| 2 | 0 | 2 | 1 |

Figure 13:
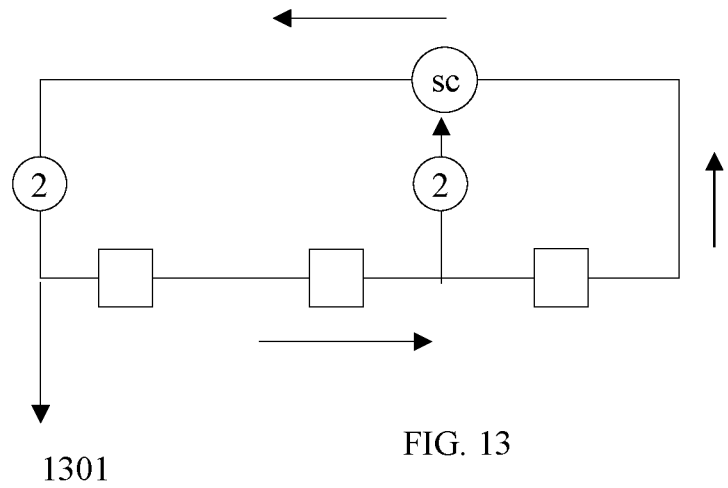
FIG. 13 illustrates a sequence generator.

FIG. 13 illustrates a 3-state sequence generator with feedback function 'sc' is the addition over GF(3) and with multipliers 2 in the relevant taps. This sequence generator generates a maximum length sequence of 26 symbols on output 1301, because the shift register has 3 3-state register elements. In the sense as explained above the sequence generator is conventional, as it can be described by a polynomial over GF(3). It is noted that the multiplier 2 is the 3-state inverter [0 1 2]→[0 2 1] as can be determined from the above truth table.

The field GF(3) has only 3 valid inverters: [0 1 2]→[0 0 0] (multiplier 0); [0 1 2]→[0 1 2] (multiplier 1); and [0 1 2]→[0 2 1] (multiplier 2). However, the 3-state machine logic has 27 possible 3-state inverters: [0 1 2]→[0 0 0]; [0 1 2]→[0 0 1]; etc.; to [0 1 2]→[2 2 2] of which only 3 are valid multipliers over GF(3). That means that any 3-state feedback shift register with an inverter not being a valid multiplier is non-conventional.

Figure 14:
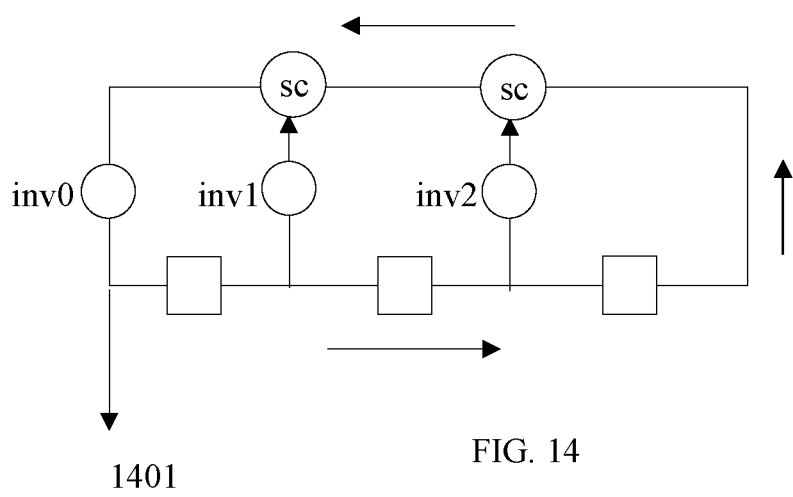
FIGS. 14-15 illustrate a sequence generator and a corresponding detector provided in accordance with an aspect of the present invention.

An unconventional sequence generator is shown in FIG. 14. It has the earlier provided 3-state function 'sc' which is conventional. The inverter inv0=[0 2 1] is conventional. However, inverters inv1=[1 0 2] and inv2=[2 0 1] are both unconventional. The sequence generator of FIG. 14 is enabled to generate a maximum length 3-state sequence on

1401 which is [2 1 1 1 2 0 0 1 1 0 1 0 2 1 2 2 2 1 0 0 2 2 0 2 0 1] with initial shift register state [1 0 2].

Another unconventional implementation is one wherein 'sc' has the following truth table:

| sc | 0 | 1 | 2 |
|---|---|---|---|
| 0 | 2 | 1 | 0 |
| 1 | 1 | 0 | 2 |
| 2 | 0 | 2 | 1 | and the following 3-state inverters as shown in FIG. 14 are used: inv0=[2 1 0]; inv1=[1 0 2] and inv2=[2 1 0]. The function 'sc' and the inverters are unconventional as not being defined by a finite field GF(3). The sequence generator of FIG. 14 is enabled to generate a maximum length 3-state sequence on 1401 which is [1 1 0 1 2 0 2 0 0 2 2 1 0 0 0 1 0 2 1 2 1 1 2 2 0 1] with initial shift register state [1 0 2].

Figure 15:
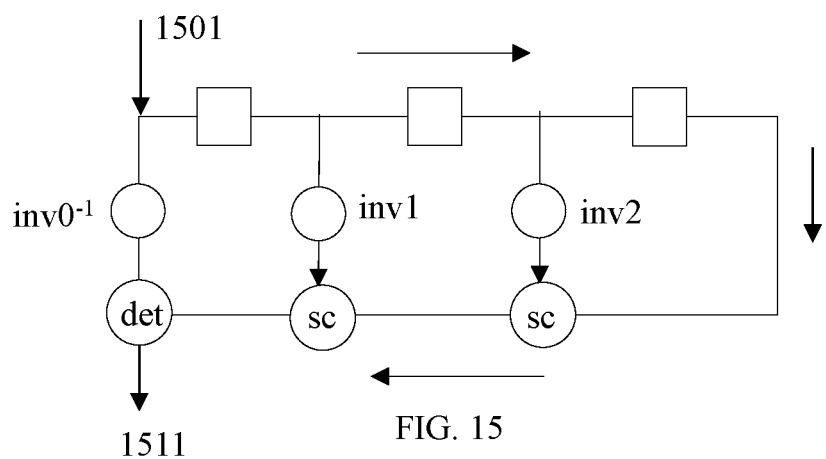

A 3-state detector corresponding to the generator of FIG. 14 is shown in FIG. 15. The sequence generated on 1401 is provided on 1501. The structure of FIG. 15 is similar to FIG. 14 with some differences. The input of 1501 is the input to the shift register and to a 3-state detector switching function 'det' via an inverter inv0$^{-1}$ which inverses inverter inv0 in FIG. 14. The inverse of inverter [2 1 0] is itself [2 1 0]. Applying [2 1 0] twice generates [0 1 2]. The switching function 'det' preferably generates only 0s when inputs are identical and not 0s when input symbols are not identical. The following truth table provides such a switching table.

| det | 0 | 1 | 2 |
|---|---|---|---|
| 0 | 0 | 1 | 2 |
| 1 | 1 | 0 | 1 |
| 2 | 2 | 1 | 0 |

Figure 16:
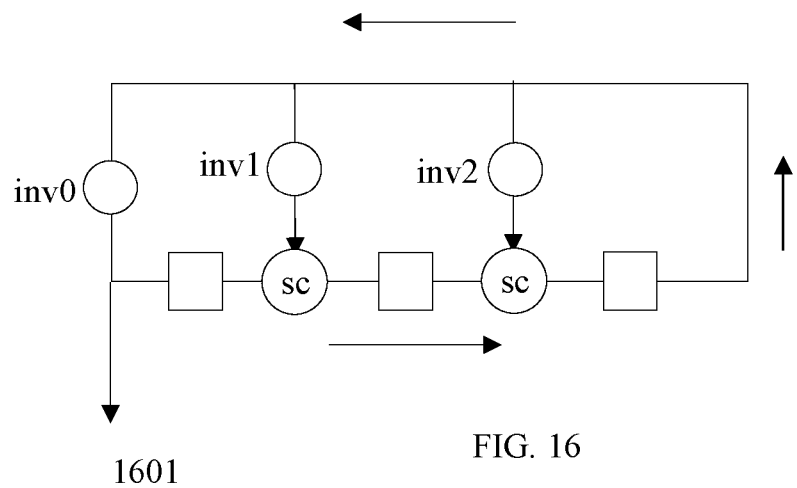
FIGS. 16-17 illustrate a sequence generator and a corresponding detector provided in accordance with an aspect of the present invention.

FIG. 16 illustrates an unconventional 3-state sequence generator in Galois configuration wherein at least the inverters or the function 'sc' do not define the finite field GF(3). A sequence of 3-state symbols is provided on output 1601.

Figure 17:
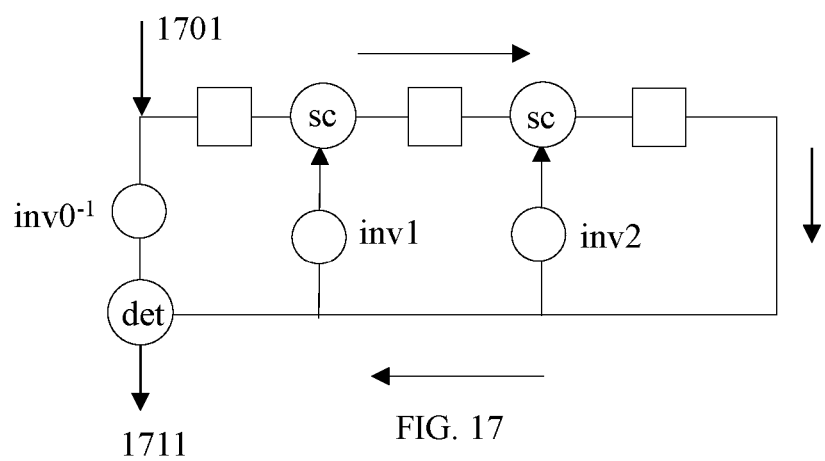

A corresponding detector to FIG. 16 in Galois configuration is provided in FIG. 17. The output sequence of 1601 is provided on 1701 and with the correct functions and inverters a sequence of all 0s is provided on 1711. A condition is that the initial state of the shift register of FIG. 17 is the same as in FIG. 16.

Figure 18:
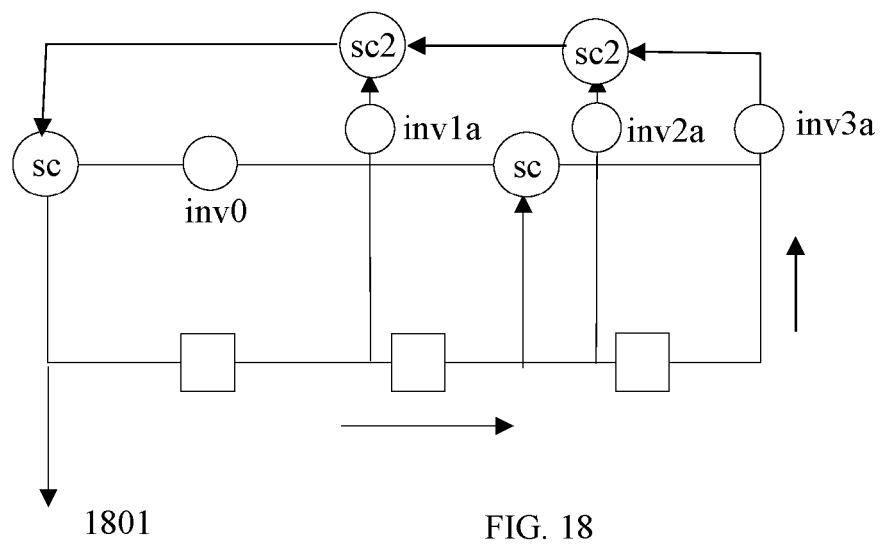
FIGS. 18-19 illustrate a sequence generator and a corresponding detector provided in accordance with an aspect of the present invention.

In accordance with an aspect of the present invention a conventional feedback loop and an unconventional feedback loop is created in the 3-state generator of FIG. 18. The conventional loop is formed by the functions 'sc' and the inverter inv0, wherein 'sc' is the 3-state mod-3 addition, inv0=[0 2 1]. The unconventional loop is formed by 'sc2' which is the above provided unconventional reversible 3-state switching function and inverters inv1a=[2 1 0], inv2a=[0 2 1] and inv3a=[1 1 0]. With initial shift register content [1 0 2] a 3-state sequence [1 1 0 0 2 0 2 1 2 2 1 0 2 2 2 0 0 1 0 1 2 1 1 2 0 1] can be generated on output 1801, which is an ML-sequence.

Figure 19:
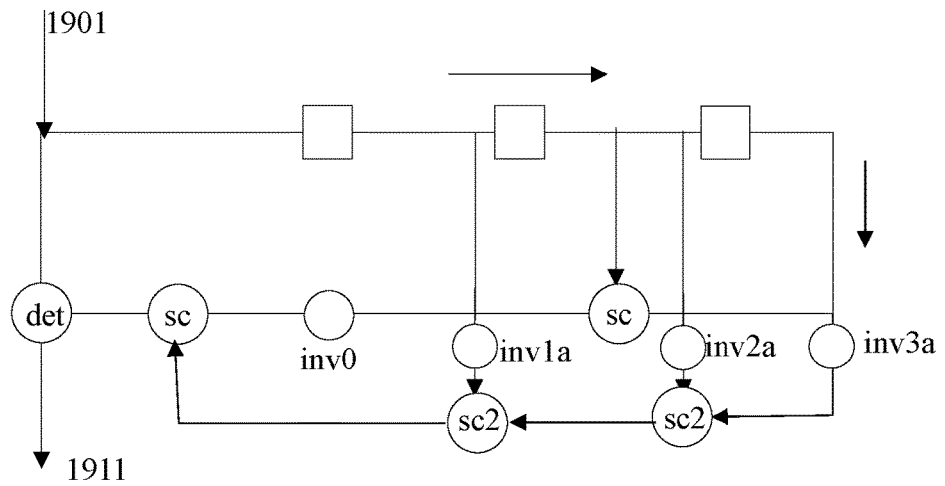

FIG. 19 illustrates a detector for the sequence generator of FIG. 18, which includes the earlier provided 3-state detector switching function 'det.' When the sequence generated on 1801 is provided on input 1901 and the initial content of the shift registers in FIGS. 18 and 19 are identical then an all 0s sequence is provided on output 1911.

A similar approach in accordance with an aspect of the present invention can be taken to create unconventional 4-state sequence generators. The conventional approach would be to use switching functions that define a conventional finite field over GF(4), which would be the addition and multiplication over GF(4) with elements {0, 1, 2 and 3} with zero element 0. The truth tables are provided below.

| GF4+ | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

| GF4 * | 0 | 1 | 2 | 3 |
|---|---|---|---|---|
| 0 | 0 | 0 | 0 | 0 |
| 1 | 0 | 1 | 2 | 3 |
| 2 | 0 | 2 | 3 | 1 |
| 3 | 0 | 3 | 1 | 2 |

Figure 20:
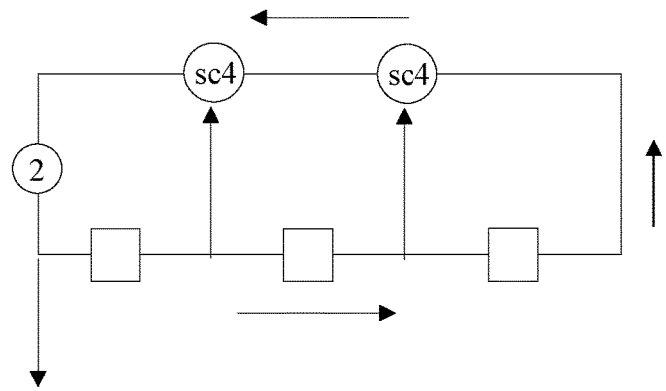

FIG. 20 illustrates a 4-state generator created with conventional switching functions over GF(4), by using the functions sc4, which is the addition over GF(4) and multiplier 2 and 1, which are the 4-state inverters [0 2 3 1] and [0 1 2 3], respectively. The generator can generate a 4-state ML sequence on output 2001 of $4^3-1=63$ 4-state symbols.

Figure 21:
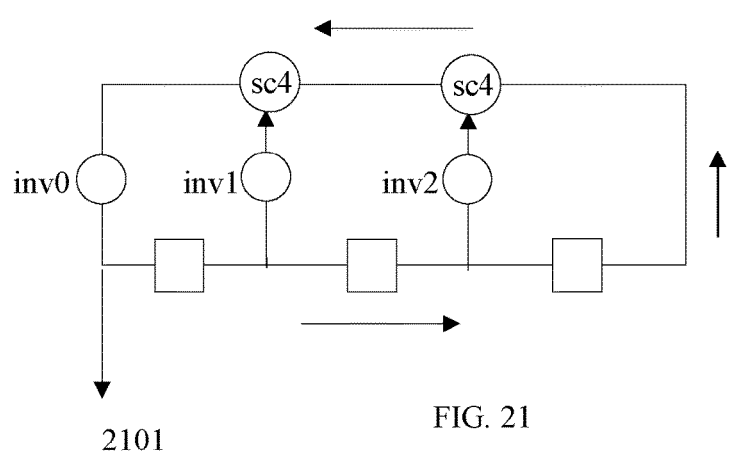

FIG. 21 illustrates a 4-state sequence generator realized with unconventional inverters inv0=[30 1 2] and inv1=[1 3 0 2] and conventional inverter inv2=[0 1 2 3] to output an ML 4-state sequence of 63 symbols on output 2101. The functions sc4 is the conventional addition over GF(4). One can construct a detector for this generator that looks similar to the one in FIG. 15. The inverter inv0$^{-1}$=[1 2 3 0] and 4-state detector function 'det' can be 'sc4' as this 4-state function generates a 0 when inputs are identical.

FIG. 22 illustrates an unconventional 4-state symbol generator similar to the previously provided 3-state generator with a first loop with conventional inverters and switching functions (sc4) and a loop with unconventional 4-state inverters inv1a=[0 2 2 0]; inv2a=[0 1 1 0]; and inv3a=[3 1 3 1] and unconventional switching functions sc4r of which the truth table is provided below.

| sc4r | 0 | 1 | 2 | 3 |
|---|---|---|---|---|
| 0 | 3 | 2 | 1 | 0 |
| 1 | 2 | 1 | 0 | 3 |
| 2 | 1 | 0 | 3 | 2 |
| 3 | 0 | 3 | 2 | 1 |

The sequence generator provides a 4-state sequence on output 2201. A corresponding detector to the sequence generator of FIG. 22 that is similar to a structure as provided in FIG. 19. The detector function 'det' in the 4-state case is the switching function sc4 which provides a 0 when identical symbols are provided on the inputs.

One can repeat the above construction of n-state sequence generators and corresponding sequence detectors for any n>2. The simplest way is to use n being a prime number or an extension field of a prime number such as GF($2^k$). However, one may also form composite finite fields from at least two different prime number finite fields.

One can create maximum length n-state sequences with a length of $k^n-1$ n-state symbols. One may also select functions and inverters, be it conventional or unconventional, that generate non-ML sequences. Sequences generated by n-state sequence generators with only conventional n-state functions and inverters are easier to reconstruct than sequences generated by sequence generators with unconventional n-state functions and/or unconventional n-state inverters. N-state sequence generators and corresponding n-state detectors are provided in accordance with one or more aspects of the present invention with n>2 wherein the sequences repeat with a period not greater than $n^k-1$ and wherein at least one n-state switching function is non-conventional and preferably with two switching functions of which a combination is non-associative.

It is noted that a 2-input n-state switching function with at least one n-state inverter at an input or an output can be replaced by a single switching function with a truth table that is modified in accordance with the n-state inverter. A conventional switching function with a non-conventional inverter at an input or output this is modified to an n-state switching function with a truth table that is unconventional for n>2.

Accordingly, unconventional n-state sequence generators have been provided that are more difficult to crack by cryptanalysis. The sequence generators as provided and the corresponding detectors can be in Fibonacci and Galois configuration.

Repeatability and predictability are the natural enemies of security. Preferably, one would want to use a key that is applied only once. If it is required to repeatedly use the same key it is preferred that the construction of the key is kept secret. A key that uses a single sequence generator is easily exposed to cryptanalysis.

In accordance with an aspect of the present invention an n-state feedback shift register (FSR) is provided that is configured to be changed in configuration during operation, in real-time, with n=2 in a first embodiment and n>2 in another embodiment of the present invention, without interference with the operation of the FSR. That is: signals are generated at a certain rate with a brief pause between signals. The rate nay be 100,000 signals per second or 1 million signals per second or at least 1 million signals or equivalence of at least 1 million symbols per second. The delay is sufficient to change the configuration and have the FSR continue to generate signals, without noticeable interruption. This is called a real-time reconfiguration or modification of the configuration of the FSR. The modification includes at least one of the following: a change in at least one used switching function, a change in tap configuration, a change in used inverters either in taps or elsewhere in the generator, a change in the length of the shift register and a change in Galois or Fibonacci configuration, a change in n of the n-state devices, for instance from binary to 4-state. In general, shift registers are considered to be fixed devices, with hard implementations in memory and/or switching devices. This is in particular the case in devices wherein processors are not powerful enough to perform security tasks in addition to other tasks. In those cases, LFSRs or NLFSRs are implemented in a fixed device such as a Field Programmable Gate Array. (FPGA). Mobile devices may suffer from underpowered processors. However, processors are becoming much more powerful. Furthermore, security of mobile devices is becoming is a much more urgent issue. In accordance with an aspect of the present invention a processor is provided to implement a reconfigurable shift register based sequence generator.

The fact that the feedback functions and the shift register are reconfigurable, does not make the device less real. A processor is still a device that processes signals, and in this case, in accordance with switching functions and inverters, which all operate on signals. The fact that one or more signals represent a symbol or n-state symbol does not change the fact that the programmable device or processor is real hardware or physical device and receives, processes and outputs or generates signals in a way that a human brain cannot and has never been able to do.

FIG. 23 illustrates a method in accordance with an aspect of the present invention. A configurable n-state shift register sequence generator is implemented for instance on a processor and a memory, wherein the memory contains all the data to configure and run the n-state sequence generator, with n=2 or n>2. The implemented generator may be in Fibonacci or Galois configuration, named $SR_F$ and $SR_G$, respectively. The processor may be a multi-core processor or multi-threaded processor. The threads for the cores may be arranged to execute each of the feedback functions of which a truth table may be retrieved from a first memory to be stored in a local memory for execution to speed up execution. This is illustrated in FIG. 24 with a supervising processor 2401 and main memory 2401 to run and manage threads 2406, 2407 and 2408 that are run by separate processing units 2403, 2404 and 2405, each including a processor core PC and a local memory LM. While three cores are shown, the multi-core multithread processor may have hundreds or even thousands of cores. All devices also have I/O communication capabilities to exchange data, which are not further identified to prevent confusing the reader. All cores are enabled to communicate with the central processor 2401 and at least with its next neighbors. After initial instruction, including implementing a switching function or table and an initial state, the cores operate independently during an execution using only relevant external data.

In a further embodiment of the present invention, the cores are connected via a configurable connection array that may be controlled via 2401 based on data retrieved from 2402. The configuration data determines for instance how many cores are required (the size of the shift registers) and the number of states. This means that the cores and local memories are large enough to store n-state symbols and n-state truth table and the interconnections have sufficient bandwidth to transfer n-state data between consecutive clock cycles of the shift register.

In step 2301 in FIG. 23 a first n-state sequence generator $SR_F$ in Fibonacci configuration or $SR_G$ in Galois configuration is implemented with k n-state shift register elements, an initial state IN1, which selected taps active and with linear or nonlinear or conventional and unconventional n-state functions connected certain taps.

It would be beneficial to apply a code for each configuration of a shift register based sequence generator. One way is to use the polynomial representation. However, not all functions and structures of a feedback shift register can be described in this conventional way. Another, preferred way, in accordance with an aspect of the present invention is to represent a sequence generator as a row or vector of switching functions, each function being 2 input/1 output or 1 input/1 output (inverter). Each function being characterized by the following characteristics:

a) a function indicator that indicates a truth table, in the binary case for instance ranging from f1 to f16 and inverters from i0 to i4; and b) all the inputs formed by either an output of a shift register element or an output of a function or inverter. c) One can make a shift register also a one input one output function called 's'. (such a s1, s2, etc). A sequence generator is then characterized by a vector of inputs and outputs of identified functions and one can automatically construct or configure the sequence generator from the characterization with an added code for an initial or starting state of the generator and a number indicating the number of cycles that the generator should operate. In accordance with an aspect of the present invention a similar approach is applied to the non-binary case.

However, in the non-binary case the number of 2-input/1-output functions and inverters is greater than in the binary case. For instance in the ternary case there are about 20,000 2-input/1-output functions and 81 3-state inverters. In the 4-state case the numbers increase exponentially. Accordingly the list of functions in different non-binary cases can be much larger than in the binary case. For instance a list has at least 100 different 2-input/1-out functions and at least 40 inverters.

After running a first sequence generator for p cycles one can reconfigure the generator as indicated in step 2302 of FIG. 23. The reconfiguration should take place within one cycle so that the generated sequence generated by two sequence generators appears as a sequence generated by a single sequence generator. For instance one could run the sequence generator of FIG. 9 for 25 cycles, use the end state of the shift register after 25 cycles as the new content to run the sequence generator of FIG. 10 for 29 cycles. One may also start the reconfigured sequence generator with another initial content that is derived or based on the last content of the shift register.

The generated sequence can be used as a secret key, which should be available to both sender and receiver.

The above approach can be taken for binary and non-binary sequence generators. One difference of course is that there are many, many more non-binary functions and inverters that can be applied to characterize a nonbinary sequence generator.

In one embodiment of the present invention a series of binary or nonbinary sequence generator configurations is created and each is provided with a unique code. The series contains conventional and unconventional generators. The codes are scrambled or coded and assigned in such a way that only sender and receiver know which code corresponds to which generator. Each code may include the number of cycles each generator runs and what the initial state is. In a different embodiment, number of cycles and/or initial state are assigned separately. Each message from a sender to a receiver is encrypted by a keyword that is newly created from a plurality of sequence generators selected from a plurality of sequence generators including unconventional ones, which each run for a to be determined number of cycles with a to be determined initial state.

In accordance with an aspect of the present invention a shift register with feedback, be it applied as a sequence generator, a coder, a scrambler, a has function or any other application are characterized by properties which are called parameters herein. Properties of feedback shift registers that are designated as parameters include: n as the value or number states that a signal can assume in the shift register which may be binary (n=2) or non-binary (n>2); the number of shift register elements; the configuration of the feedback (Fibonacci or Galois); the position of the taps; the inverters that determine the taps; the functions in the feedback shift register at the end of a tap; inverters in the conventional feedback path and the position therein; the position of the non-conventional feedback path and the functions and connections therein; initial content of the shift register; number of cycles that a specific configuration is run.

The state of the feedback shift register can be changed in a new configuration. For instance, a binary feedback shift register has 8 shift register elements. The configuration may be changed to a 4-state feedback shift register with 4 4-state shift register elements. The content of the 8 bit binary shift register is converted into 4 elements with 4-state symbols, which can still be represented as bits.

Figure 25:
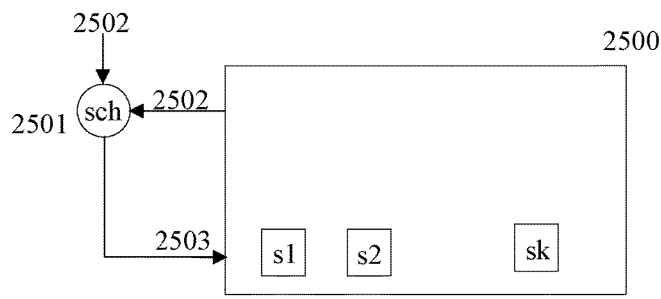
FIG. 25 illustrates a hash code generator provided in accordance with one or more aspects of the present invention.

Hash functions are used to map symbols into a reduced set of symbols. For instance the content of an n-state shift register with feedback can be used as a hash code or hash code generator. This can be achieved by modifying the binary and non-binary sequence generators as provided herein into scramblers, by inserting an n-state switching function that mixes the content of generated symbols with a sequence of external data symbols. This is illustrated in FIG. 25, which shows an n-state shift register with feedback 2500 with a shift register with k shift register elements s1, s2 . . . sk. The shift register with feedback can be in Galois or Fibonacci configuration. The functions in 2500 can be conventional or contain at least one unconventional or non-associative n-state function or inverter. N can be 2, (binary) or n can be greater than 2, the non-binary case.

Hash codes are for instance used as an authenticity stamp. For that reason one would prefer that one cannot tamper with a content in such a way that a same hash code is created. In that sense, non-binary hash functions are presumably much more secure. The feedback path 2502 of the feedback shift register which is an output to an input 2503 into the feedback shift register is 'cut' and an n-state switching function 'sch' 2501 is inserted which receives on one input the feedback symbols and on another input the external symbols 2502, which are outputted on 2503 which is a path into the shift register circuit. As a difference with a scrambler, no stream of scrambled data is created. The stamp will be the content of the shift register after all external symbols have been entered. The difference with known hash devices is that the circuit 2500 in one embodiment of the present invention contains unconventional n-state switching functions which preferable have at least 2 functions that are not associative.

In a further embodiment of the present invention n>2 and the function 'sch' is unconventional. In one embodiment of the present invention 'sch' is not reversible. In one embodiment of the present invention the content of the shift register at the start of hashing is not all 0. In a further embodiment of the present invention, during hashing of external symbols, at least the configuration of 2500 is modified at predetermined moments or cycles. In yet a further embodiment of the present invention at least the function 'sch' is modified at least once at a predetermined moment during hashing.

It is known that conventional n-state shift registers with feedback that are self-contained as sequence generators have one shift register state that will not occur when the shift register has transitions and the device runs autonomously. This is called the forbidden state or the singular state and it is the reason why in general an n-state feedback shift register with k elements can run a maximum number of $n^k-1$ unique contents of the shift register without repeating. In conventional binary and non-binary shift registers with feedback, the forbidden state is all 0s. The forbidden state is a logic state that is inconvenient. The physical state of all 0s by itself is allowed and is not a physically impossible state. The shift register device will run, but will show no transitions in the output.

Figure 26:
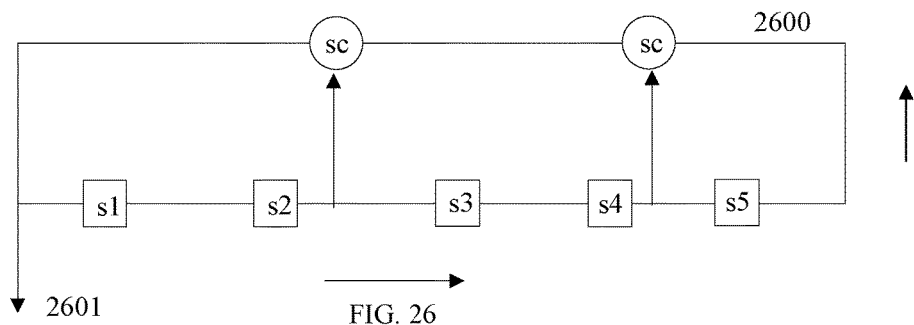
FIGS. 26-29 illustrate sequence generators provided in accordance with an aspect of the present invention.

By using unconventional n-state functions and inverters, one can create n-state sequence generators that will output all 0s, or all 1s or all ns, symbols. This is illustrated in FIG. 26. If the sequence generator 2600 is binary, the content of the 5 shift register elements [s1 s2 s3 s4 s5]=[0 0 0 0 0] and 'sc' is the XOR function, then a sequence of all 0s will be generated on 2601. However, if the content of the 5 shift register elements [s1 s2 s3 s4 s5]=[1 1 1 1 1] and 'sc' is the EQUAL function, then a sequence of all is will be generated on 2601. It is not required to have 5 shift register elements, one can create these sequence generators with 2 shift register elements or more shift register elements. The same applies for nonbinary sequence generators. If the contents is all 0 and sc is the 4 state addition over GF(4) then an all 0 sequence will be generated. If 'sc' is a 4-state function wherein identical input symbols generate a '3' and the initial content of [s1 s2 s3 s4 s5]=[3 3 3 3 3] then an all 3s sequence will be provided on 2601.

Accordingly, one can create a sequence generator to generate series of identical symbols by modifying the initial sequence generator in contents and in feedback functions. For instance one can start with initial content all 0s and with sc being the XOR function and modify after 1024 symbols to an all 1s content and using the EQUAL function and switch back to the original configuration after 2048 symbols. A similar approach can be applied to create series of identical symbols such as consecutive 64 all 0s, 64 all 1s, 64 all 2s and 64 all 3s.

Figure 27:
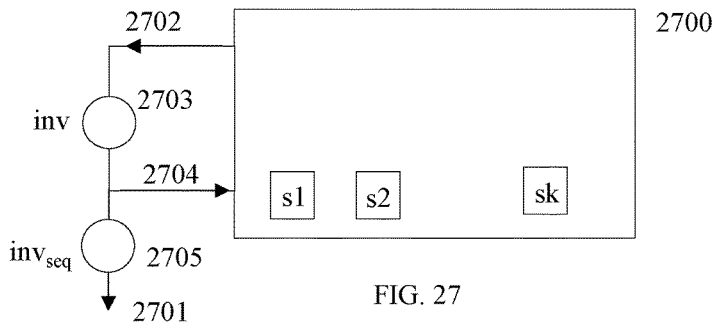

Another way to achieve a switch between long series of identical symbols is to run the generator in a forbidden condition, for instance all 1 s. This is illustrated in FIG. 27. By placing an inverter $inv_{seq}$ 2705 before the output 2701, but after the feedback 2704 back into the shift register device 2700 with shift register [s1 s2 s3 . . . sk], one influences the outputted sequence without affecting the actual generator. For instance, a binary generator 2700 output all 1s on the path 2702, which has a straightforward connection 2703 (or inv=[0 1]) to 2704 back into the generator. If 2705 $inv_{seq}$=[0 1] then 2701 generates all 1s. However, if $inv_{seq}$=[1 0] then 2701 generates all 0s.

If 2700 in FIG. 27 is 3-state and generates all is on 2702 then 2701 generates all 1s if $inv_{seq}$=[0 1 2] or identity. When $inv_{seq}$=[1 2 0] then 2701 will generate all 2s. The output thus is changed by changing only $inv_{seq}$.

Figure 28:
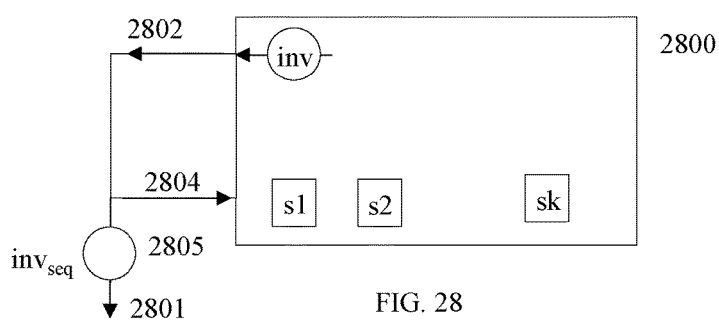

The inverter 'inv' not being identity may be an inherent part of the sequence generator, for instance to make 2700 a ML 4-state generator. One could draw 2702 also inside 2700, as is shown in FIG. 28. The inverter 'inv' is identified as being part of the sequence generator 2800 and if one only wants to change an output sequence, without changing the sequence generator, the inverter 'inv' should be left alone and only $inv_{seq}$ 2805 is changed before ouputting on 2801. The connections 2802 and 2804 form a part of the feedback loop into the shift register. For instance one can modify an all is 4-state sequence generator to an all 3s sequence generator by making $inv_{seq}$=[2 3 0 1] for instance. (or any inverter [x1 3 x2 x3] for that matter.)

In order to hide the characteristics of a sequence generator to prevent easy cryptanalysis, the output of the sequence generator is changed by changing the inverter $inv_{seq}$ which takes place in some predetermined way at the transmitter that is repeated at the receiver. It is not required that the inverter $inv_{seq}$ is reversible. In fact it is preferable that the inverter $inv_{seq}$ in one embodiment is unconventional, (not being a multiplier in a conventional finite field) and in one embodiment being not reversible. For instance if the sequence generator 2800 is a 4-state ML generator of 1023 symbols, one may use an inverter [2 0 1 0] for 256 symbols, [0 1 1 3] for the following 256 symbols, [2 1 2 3] for the following 256 symbols and [3 2 1 0] for the last 255 symbols. Preferably, one keeps the number of cycles that a specific inverter is used in one embodiment to at most (k-1) generated symbols by a generator of k shift register elements, or to not more than 2*(k-1) generated symbols in another embodiment of the present invention or to not more than 10*(k-1) symbols in yet another embodiment of the present invention.

The lower the value of n, the less one should rely on changing inverters and more on changing the sequence generator as described earlier. On the other hand, the higher the value of n, the more opportunity there is to significantly disturb the output of a sequence generator. For instance, when n=256, or when a word of 8 bits is considered to represent a 256-state symbol there is significant opportunity to use different inverters $inv_{seq}$. A 256-state inverter would be described as [0 1 2 . . . 254 255]=[p0 p1 p2 . . . p254 p255], wherein the inverter modifies state 0 into p0 and state 254 into p254]. This offers $256^{256}$ 256-state inverters and 256! reversible inverters. This by itself provides sufficient variation. If also 'inv' 2703 is modified at the same time or alternately with 2705, it will be even harder to reconstruct the sequence generator. One may also change other configuration aspects of the sequence generator. The modification of a generated sequence in a sequence generator is applied to Fibonacci and to Galois configurations and to binary and nonbinary sequence generators.

It is noted that shift register based sequence generators, be it binary or non-binary, or linear or non-linear, or conventional or unconventional, all generate sequences that are essentially balanced or pseudo-uniform. This certainly applies to ML (maximum length) sequence generators. It is considered to be a universal property of shift register based sequence generators with no structural changes. The distribution is called pseudo random when the total number of symbols in the sequence is not an exact multiple of n or when the generator is run for a time that does not allow a uniform distribution. However, the distribution of symbols is almost uniform, generally within 2 symbols. For instance a sequence of binary symbols generated by a binary shift register based sequence generator has about as many 0s as 1s; a 3-state sequence generated by a shift register generator has about as many 0s, is and 2; and an 8-state sequence generated by an 8-state shift register based sequence generator has about the same number of 0s, 1s, 2s, 3s, 4s, 5s, 6s and 7s.

This is an important giveaway on how a sequence of symbols is generated. A change in the distribution, without further modification may indicate how the sequence was modified. In accordance with an aspect of the present invention a structure of a sequence generator that generates an available sequence of n-state symbols is determined by using a sequence detector with a configurable structure based on an n-state shift register with k elements or stages. A quick analysis of a sequence will determine the states of the symbols. An analysis of the maximum number of symbols (0s or 1s or others) will indicate the number of shift register elements. Based on n and the number k one can then construct a generic n-state non-linear or unconventional sequence generator. Assume that part of a received sequence is [1 0 1 0 0 1 0 1 1 1 1 0 1 0 0 0 0 1 1 0 0 1 1 0 1 1 1 0 0 1 0 0 1 1 1 1 1 1 0 0 0 0 0 1 0 0 0 1 1 1 0 1 1 0 0 0 1 0 1 0 1 1 0]. The sequence is clearly binary. It has one series of 6 bits. This indicates that the shift register has 6 stages or 6 shift register elements. Based on the earlier cited Dubrova reference, one may assume that the sequence may have been generated by either an LFSR or an NLFSR, for instance in accordance with the Dubrova NLFSR.

Figure 29:
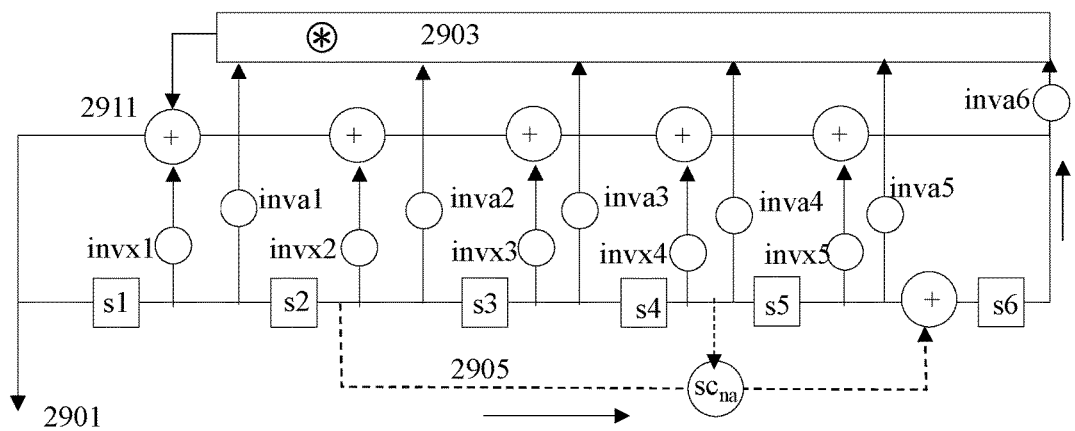

A generic binary 6-stage or 6 register elements shift register with feedback in LFSR/NLFSR configuration is illustrated for in FIG. 29. For simplicity the AND function is used as the non-linear feedback function and is represented as ⊛ 2903 and as 3003 in FIG. 30. The AND function is associative and one does not have to worry about an order of execution. It may be that the generator is LFSR and that none of the AND function is used. One also does not know what the specific feedback taps are. In accordance with an aspect of the present invention, the effective taps are determined by inverters. The '+' is the binary XOR function. The tap into the XOR is effective is the inverter 'invxk' such as 'invx5' is [0 1] or identity. If the tap is not active the inverter 'invxk' is [0 0] or open. One may also use inverters [1 0] and [1 1] but are ignored for simplicity.

One may apply a similar reasoning for the taps into the AND function. These are the inverters 'invak.' However representing an open tap as inverter [0 0] is problematic as it affects the chain. An inverter [0 0] means that the tap always provides a signal representing symbol 0. This makes the end result of the AND chain always 0. In order to make a tap ineffective one should make the inverter 'invak' [1 1]. The [1 1] inverter is called the always-on inverter. For that reason the feedback tap from the last shift register element into the AND also has an inverter, 'inva6.' Accordingly, the inverters 'invxk' can be [0 0] or [0 1] and the inverters 'invak' can be [1 1] or [0 1] to describe all possible configurations.

Figure 30:
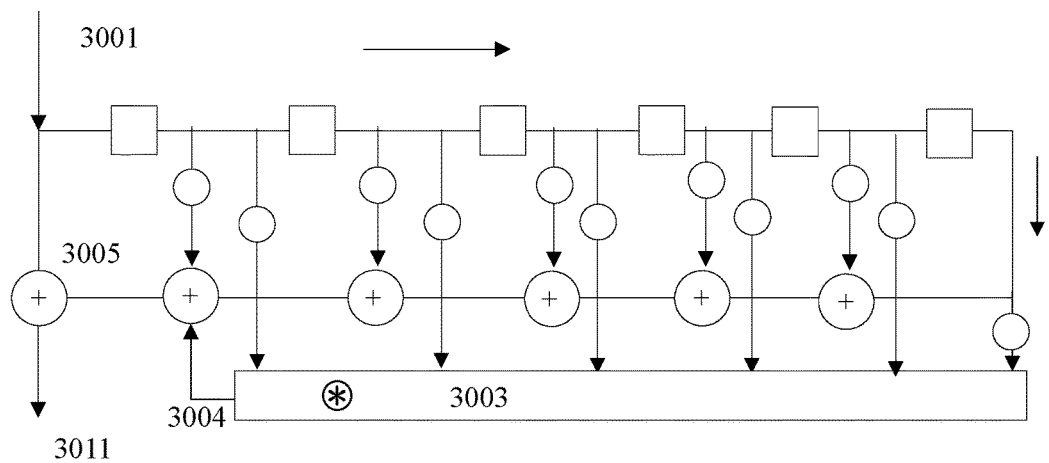
FIG. 30 illustrates a detector provided in accordance with one or more aspects of the present invention.

One uses then the generic FIG. 29 as assumed to generate the above sequence on an output 2901. The corresponding detector is shown in FIG. 30 with an input 3001 to receive the sequence and with non-linear function ⊛ 3003. If one selects the correct inverters that match inverters to generate the sequence, the '=' function 3005 will generate all 0s. Accordingly, one will process the sequence with the detector having each possible inverter combination. In this case there are 5+6=11 different inverters, each having one of two possible implementations: [0 0] and [0 1] for 'invxk' and [1 1] or [0 1] for 'invak'.

Running all possible combinations with complete processing of the 63 symbols and noting selected inverters with [i1a i2a i3a i4a i5a i6a i1x i2x i3x i4x i5x], wherein 1 identifies [0 0], 2 identifies [0 1] and 3 identifies [1 1], for instance in a Matlab program, will generate [3 3 3 2 2 3 1 1 1 2 2] as the only configuration wherein the detector generates all 0s. The shift register is flushed after 6 cycles. Accordingly, if one does not know the initial state of the shift register one should start counting zeros as of cycle 7. This is the same configuration, identified as 0,1,2, (1,2) with n=6 in the Dubrova article.

It is also noted that the detector starts running 0s right from the start with the correct configuration and initial state of the shift register. There are other configurations that possibly generate the first 6 or 7 symbols. However after 10 symbols, only the single configuration is identified.

A similar approach can be taken with the non-linear function being the OR function. In that case a sequence generated is [1 0 1 0 0 1 0 0 0 1 1 0 1 0 1 1 1 0 1 1 0 1 1 1 1 1 1 0 0 0 1 0 0 1 1 0 0 0 0 0 1 0 1 1 0 0 1 0 1 0 0 0]. To detect the configuration one uses the detector of FIG. 30, but now with the OR function and run through all possible inverters including 1=[0 0], 2=[0 1] and 3=[1 1]. The configuration that generates all 0s is [i1a i2a i3a i4a i5a i6a i1x i2x i3x i4x i5x]=[1 2 2 1 1 1 1 1 2 2]. In this case the [0 0] inverter can be used to disconnect an shift register element from the OR function.

It shows that with sufficient symbols in a sequence and with using associative functions, one can easily reconstruct the generating sequence generators if one knows that only AND or OR functions are used. It should be clear that reconstructing the sequence generator becomes much more complex when non-associative switching functions are used. Non-associate functions, which include non-commutative functions, generate output signals that depend on an order of inputs. In FIGS. 29 and 30, the AND or OR function 2903 or 3003 are represented by ⊛. In FIG. 30 the combined function ⊛ outputs a result on 3004 which is further provided to an XOR function. Assume further that the inputs into ⊛, after being inverted are a1, a2, a3, a4, a5 and a6, which correspond (after inversion) to shift register elements outputs s1, s2, s3, s4, s5 and s6. The generating expression is then output 3004=a1 ⊛ a2 ⊛ a3 ⊛ a4 ⊛ a5 ⊛ a6.

Figure 31:
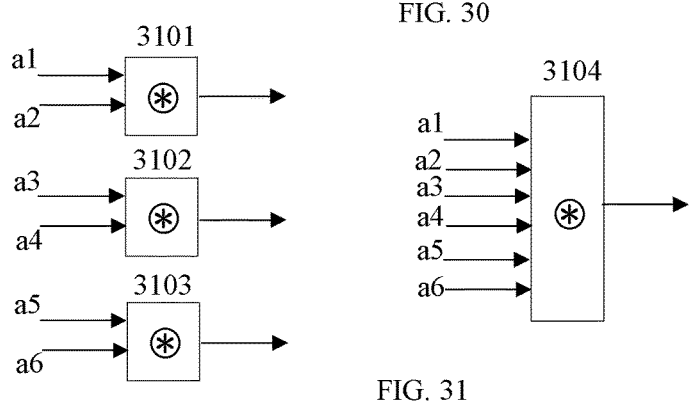
FIGS. 31-33 illustrate switching devices arranged in accordance with an aspect of the present invention.
Figure 32:
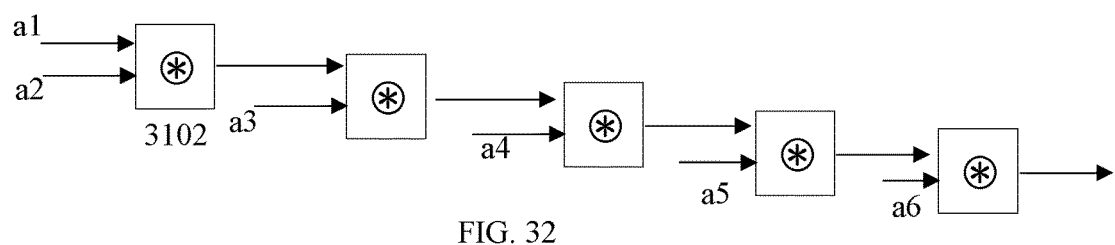
Figure 33:
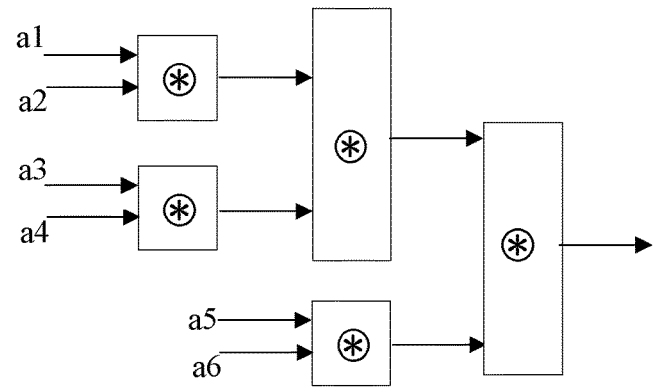

A diagram of a device that performs the above expression is shown in FIG. 31 as 3104. However in general such devices do not exist, and one has to form a device such as 3104 from individual devices 310, 3102 and 3103 as also shown in FIG. 31. In general switching devices are two input devices or single input devices such as inverters. However, if ⊛ is associative, it does not matter how one combines the devices as the ultimate output is always the same based on the input signals. Even if one implements the switching functions on a processor, which creates a switching device, the functions used are generally 2 input ones. FIG. 32 and FIG. 33 show different configurations that would generate the same output if ⊛ is associate. However, the configurations may generate entirely different outputs if ⊛ is non-associative such as the NAND and NOR function or if ⊛ is non-commutative.

The effect of non-associative functions can be demonstrated easily. Take the generator of FIG. 29 and make ⊛ the NOR function with the following truth table:

|   | 0 | 1 |
| --- | --- | --- |
| 0 | 1 | 0 |
| 1 | 0 | 0 |

A configuration as in FIG. 29 with taps to the XOR on s4, s5 and s6 and taps on the NOR function first on s2 and s4 and the output of that NOR function is combined by a second NOR function with a tap to s6. This will generate [1 0 0 1 0 1 0 0 0 0 0 1 1 0 0 1 0 0 0 1 0 1 1 1 1 0 0 1 1 0 1 1 0 0 0 0 1 0 0 1 1 1 1 1 0 1 1 1 0 0 0 1 1 1 0 1 0 1 1 0].

A configuration as in FIG. 29 with taps to the XOR on s4, s5 and s6 and taps on the NOR function first on s4 and s6 and the output of that NOR function is combined by a second NOR function with a tap to s1. This will generate [0 0 0 0 1 1 1 1 1 0 1 1 1 0 0 0 1 0 1 1 1 0 0 0 1 0 1 1 1 0 0 0 1 0 1 1 1 0 0 0 1 0 1 1 1 0 0 0 1 0 1 1 1 0 0 0 1 1 1 0 0].

The first sequence is a ML sequence, while the second is not. Clearly the order of input does matter. It also shows that detecting the correct generating configuration using the detector becomes much more complex and takes much longer time. One now has to take at least some order of switching into consideration. This becomes even more complicated if the non-linear function is a non-commutative logic switching function.

For instance in one embodiment of the present invention two non-linear switching functions are used that are non-commutative. The truth tables are provided below.

| st | 0 | 1 |
|---|---|---|
| 0 | 1 | 1 |
| 1 | 0 | 1 |

| gt | 0 | 1 |
|---|---|---|
| 0 | 0 | 0 |
| 1 | 1 | 0 |

Using again the taps for XOR to s4, s5 and s4. Furthermore a tap is realized from s5 to the input of function 'st' that determines the row of the truth table of 'st' and from s1 that determines the column of the truth table of 'st'. Furthermore the output of 'st' is inputted to the input of 'gt' that determines the row of the truth table of 'gt' and a tap is realized from s6 to the input of 'gt' that determines the column of the truth table of 'gt'.

The generated sequence is [1 1 1 1 1 1 0 1 0 1 1 1 0 1 1 0 0 1 1 1 0 0 0 1 1 0 1 0 0 0 1 0 0 1 0 1 0 0 1 1 0 0 0 0 0 0 1 1 1 1 0 0 1 0 0 0 0 1 0 1 1 0/1 1 1 1 1 1 0 1 0 1 1]. The slash is not part of the sequence but marks the point of repeat of the sequence, which indicates that the sequence is 62 bits long and unique over that length. Merely changing the order of inputs of s5 and s1, completely changes the generated sequence.

In accordance with an aspect of the present invention a binary sequence generator is made non-linear by including preferably at least one non-commutative binary function in a feedback loop of a shift register, more preferably include two non-associative binary functions in the feedback loop of the shift register and most preferably at least two non-commutative binary functions in the feedback loop of the shift register.

In accordance with a further aspect of the present invention a binary sequence generator is made non-linear by including at least two different commutative non-linear functions in the feedback loop of the shift register. The functions may be all associative, or at least one function is associative and one function is non-associative.

In accordance with an aspect of the present invention at least one function in a feedback loop of a shift register based sequence generator is selected from the group consisting of NAND and OR functions. In accordance with an aspect of the present invention at least two different functions in a feedback loop of a shift register based sequence generator are selected from the group consisting of AND, NAND and OR functions. In accordance with an aspect of the present invention at least two different functions in a feedback loop of a shift register based sequence generator are selected from the group consisting of NOR, NAND and OR functions. In accordance with an aspect of the present invention at least two same functions in a feedback loop of a shift register based sequence generator are selected from the group consisting of NOR, NAND and OR functions. In accordance with an aspect of the present invention at least one function in a feedback loop in a feedback shift register contains is non-associative. In accordance with an aspect of the present invention at least two functions in a feedback loop in a feedback shift register are non-associative. In accordance with an aspect of the present invention at least three functions in a feedback loop in a feedback shift register are non-associative. In accordance with an aspect of the present invention at least one function in a feedback loop in a feedback shift register contains is non-associative and is selected from the group consisting of the NAND function and the non-commutative switching functions.

In accordance with an aspect of the present invention an output sequence of a shift register device is the content or part of a content of the shift register. In accordance with an aspect of the present invention an output sequence of a shift register device is a modified or scrambled version of an input sequence. In accordance with an aspect of the present invention an output sequence of a shift register device is autonomously generated by the shift register device wherein the length of the output sequence is or may be longer than the length of the shift register.

A feedback loop in a feedback shift register may be a path from an output of a shift register element that is downstream the shift register to an input of an upstream shift register element in the shift register. One such feedback loop is the path from the output of s6 in FIG. 2901 via 'inva6' through 2903 through '+' to s1.

As was explained earlier, the term non-linear, if applied to non-binary shift registers, means shift registers with feedback functions that are not switching functions defined by the addition and multiplication over a finite field GF(n). Furthermore switching functions formed from an addition over GF(n) of which one or more inputs are modified by an inverter that is a multiplication over GF(n) are associative. In addition, one may create an unconventional nonbinary shift register with feedback wherein a switching function is defined by a finite field with a zero element that is not 0. The zero element 'z' being the element that defined a*z=z and a+z=a, with and '+' being the multiplication and addition over the finite field.

In accordance with an aspect of the present invention a conventional or linear nonbinary sequence generator is made non-linear by including preferably at least one non-commutative nonbinary function in a feedback loop of a nonbinary shift register, more preferably include two non-associative nonbinary functions in the feedback loop of the shift register and most preferably at least two non-commutative nonbinary functions in the feedback loop of the shift register. It is noted that a commutative nonbinary switching function is made noncommutative by placing different inverters at the two inputs.

In accordance with a further aspect of the present invention a conventional or linear nonbinary sequence generator is made non-linear by including at least two different commutative non-linear or unconventional nonbinary functions in the feedback loop of the nonbinary shift register. The functions may be all associative, or at least one function is associative and one function is non-associative.

In accordance with an aspect of the present invention at least one nonbinary function in a feedback loop of a nonbinary shift register based sequence generator is selected from the group of reversible nonbinary switching functions not including an addition over GF(n) with zero element 0. In accordance with an aspect of the present invention at least two different nonbinary functions in a feedback loop of a shift register based sequence generator are selected from the group of reversible nonbinary switching functions not including an addition over GF(n) with zero element 0. In accordance with an aspect of the present invention at least two different nonbinary functions in a feedback loop of a shift register based sequence generator are selected from the group consisting of non-associative nonbinary switching functions.

The inventor has shown in U.S. Pat. No. 7,487,194 issued on Feb. 3, 2009, which is incorporated herein by reference, that Fibonacci feedback shift registers have equivalent realization in Galois configuration.

The literature, such as the above mentioned Dubrova article, describes how the non-linear terms in NFLSRs are defined by expressions such as f (x0, x1, . . . , xn−1)=x0⊕xa⊕xb⊕xc⊕xd⊕xe·xh. Herein the term xe.xh is the AND between symbol xe and xh. The operation ⊕ is the XOR operation. If only the XOR operation is used in the FSR (feedback shift register) it is called linear. The use of the AND function to combine symbols generated in the FSR thus make FSR nonlinear. The use of the AND function in the literature is likely caused by the need for a mathematical description of the FSR in the form of polynomial expressions. As stated elsewhere herein, the literature appears to consider FSRs to be strictly extensions of mathematical expressions. The inventor takes, what is believed a novel view that FSRs are switching devices of which the class that uses XOR functions can be described by polynomial expressions and many other classes of FSRs, in binary and non-binary circuitry exist that cannot easily be described in arithmetical expressions over GF(2) or GF($2^p$).

For instance, the finite field GF(2) is defined over the addition XOR and the multiplication AND. The binary extension fields to generate the polynomial expressions of non-binary FSRs, for RS coders for instance, are derived from the classical field GF(2). The inventor found that a finite field GF(2) is also defined by the multiplication EQUAL and the multiplication OR. The zero multiplication is then the inverter [1 1]. In accordance with an embodiment of the present invention FSRs are provided wherein an inverter [1 1] ('always on') is included. In accordance with an embodiment of the present invention a [1 1] inverter is placed in a feedback tap of an FSR.

The inventor realized that the linearity of the binary FSR can be broken up by using any other function in a feedback loop than the AND function. FSRs are considered to be true devices and inclusion of switching devices that have not been used prior in sequence generators and other FSR devices are thus novel. The prior art did not realize that the AND function is an associative function which in some cases facilitates cryptanalysis. Accordingly, feedback configurations as disclosed in FIG. 9, wherein an order of connection is important, due to the associative nature of the function 'sc' offer significant and important security over the prior art that only applies the AND function.

The inventor is aware of one disclosure that provides an FSR that contains a NOR function. That is U.S. Pat. No. 6,769,084 to Kim ("Kim") issued on Jul. 27, 2004 which is incorporated herein by reference. Kim shows a single NOR 522 in FIG. 5 of that disclosure. Kim fails to recognize that the NOR function is non-associative as is demonstrated in FIGS. 3A and 3B of Kim. Herein Kim provides 4 inputs to the NOR functions, which renders the structure indefinite, because a NOR is non-associative. Clearly, Kim does not realize that a connection order should be disclosed. FIG. 5 shows only one NOR function and the issue does not come up therein. FIG. 5 shows a Fibonacci configuration. The FIGS. 3A and 3B are indefinite if not in error.

In accordance with an embodiment of the present invention a binary FSR is provided wherein at least one switching device in a feedback path is characterized by a binary non-associative switching function selected from the group consisting of NAND, and a group of non-commutative functions. The non-commutative 2-input/1 output non-commutative functions in the group are characterized by the following truth tables:

| a > b | 0 | 1 |
|---|---|---|
| 0 | 0 | 0 |
| 1 | 1 | 0; |

| b > a | 0 | 1 |
|---|---|---|
| 0 | 0 | 1 |
| 1 | 0 | 0; |

| ~(b > a) | 0 | 1 |
|---|---|---|
| 0 | 1 | 0 |
| 1 | 1 | 1; | and

| ~(a > b) | 0 | 1 |
|---|---|---|
| 0 | 1 | 1 |
| 1 | 0 | 1. |

The names of these functions: a>b; b>a; ~(b>a); ~(a>b) are equivalent to their corresponding truth tables, respectively.

In an embodiment of the present invention a binary and a non-binary FSR has a first and a second path to get from an output of a shift register element to an input of another shift register element which run at least partially parallel and concurrently. In a further embodiment of the present invention the shift register elements of the first and the second path do not have to be the same, but they may. In a further embodiment of the present invention the shift register elements of the first and the second path are not the same. A path is defined by connections. A path includes the one or more functions it traverses. As an example, FIG. 9 has different paths that run parallel and concurrently: path 925 from 510 to function 920. A path from element 508 via functions 923, 922 and 921 to 920 to 502. A path from 508 via 902, 903, 904, 921 and 920 to 502. FIG. 10 shows another set of different paths. In accordance with an aspect of the present invention a binary FSR is provided with at least a first and a second path between shift register elements, wherein at least one path traverses two non-associative binary functions. In accordance with an aspect of the present invention a binary FSR is provided with at least a first and a second path between shift register elements, wherein at least one path traverses two non-associative binary functions which are not all NOR functions. In accordance with an aspect of the present invention a binary FSR is provided with at least a first and a second path between shift register elements, wherein at least one path traverses two non-associative binary functions which are non-commutative functions. In accordance with an aspect of the present invention a binary FSR is provided with at least two non-associative functions which are not in a single path. In accordance with an aspect of the present invention a binary FSR is provided with at least two non-associative functions.

In general autonomous sequence generators and scramblers have shift registers with feedback loops or paths. There is at least one path that is a signal path that runs from the last shift register element to the first. This is illustrated in FIG. 9 and also in FIG. 29. This path is called the primary feedback path or the primary path. The feedback requires that the upstream content of the shift register depends on the content of downstream shift register elements. A second path 2903 is created in FIG. 29. It is not required that this second or secondary path moves data from downstream to upstream. In one embodiment of the present invention a downstream content, for instance the content of s5 in FIG. 29, is combined via an addition with a signal created by combining the content of s2 and s4 with a non-associative function $sc_{na}$ with the content of s5 before it is stored in s6. This creates a secondary path 2905 in the shift register based device of FIG. 29. In one embodiment of the present invention $sc_{na}$ is a NAND functions or a non-commutative function. In one embodiment of the present invention $sc_{na}$ is a NOR function. The secondary path 2905 has been drawn as dashes as it is not applied for the device of FIG. 30.

In case of a feedback shift register, one or more signal paths exist following a signal through the loop from an input of the first shift register element through the device following the direction of the signal until it reaches again, modified, the input of the first shift register element. No matter if a signal path branches off, as is shown in FIG. 29 for instance as 2903 or 2905, the branches always connect back to the loop. Accordingly, all functions, as for instance shown in FIG. 29 are part of the loop. The loop includes many paths. For instance one signal path in FIG. 29 may be from s1 to s2 through inva2 into 2903 to function 2911 back to the input of s1. Many different signal paths are present in the loop and each signal path contains at least one switching function. This applies both to Galois and Fibonacci shift registers with feedback.

FIG. 30 illustrates the descrambler corresponding to the scrambler of FIG. 29. There are no feedback paths in the descrambler. A primary path can be distinguished from the last shift register element to the output 3011 of the device of FIG. 30 through all the '+' functions. A secondary path exists through 3003 to the output. Another secondary path in FIG. 30 would correspond to 2905. However, this path has been omitted to not overcrowd the drawings. Accordingly, not all paths in shift register based devices are feedback paths.

The above aspects for binary and nonbinary shift registers with feedback apply to Fibonacci and to Galois configurations. The above aspects or configurations for binary and nonbinary shift registers with feedback apply to scramblers enabled to process external symbols through the shift register. The above aspects or configurations for binary and nonbinary shift registers with feedback apply to hash code generators wherein a content of the shift register is used as a hash code.

Sequence generators, including scramblers and hash function generators which generate the content of a shift register with multiple elements are physical devices that generate sequences of signals. For human convenience the signals are represented by symbols. However all generators to generate the sequences are physical apparatuses.

The non-linear FSRs as provided herein in one embodiment of the present invention are part of a sequence generator that is modified during operation to further increase security and resistance to cryptanalysis or for other purposes.

Changing the Distribution of Symbols

It has been noted earlier above that in general the distribution of symbols in a sequence generated by a binary or non-binary shift register based sequence generator is uniform or almost uniform. That is: a sequence of binary symbols has about the same symbols 0s as 1s. In a 4-state sequence the numbers of 0s. 1s, 2s and 3s is about equal. As described, one can change the distribution by inserting an n-state inverter that inverts one nonbinary symbol to another one. However, that means that one n-state symbol will be missing one n-state symbol is over represented. If one wants to hide how the redistribution was achieved, such a redistribution is not desirable.

In accordance with an aspect of the present invention, a redistribution of symbols is achieved by a counting scheme. That is, one counts, from the start or any other point in a sequence, for instance starting from 12 symbols, p symbols and inverts the pth or (p+1)th symbol. In the binary case that is simple, one inverts a 0 to 1 or a 1 to 0. In accordance with yet another aspect of the present invention one inverts the pth or (p+1)th symbol of a predetermined value. For instance one inverts only 0s or 1s, or 2s or (n−1)s symbols. This means that one can control the actual distribution of symbols if one starts with a uniform or almost uniform distribution. Preferably not a uniform change is used, but for instance a first change at the pith occurrence a second change at the p2th occurrence, etc.

In accordance with an aspect of the present invention a scheme can be used to further modify the sequence. That is: a basic sequence, created in accordance with one of the aspects provided herein, is applied as a keyword or as a key sequence for coding. However, based on the time, date, message number or recipient or some other agreed condition some symbols in the key sequence have been modified to code the message.

For instance a modification of a binary sequence of 128 symbols may be [3 1_3 0_5 0_8 1_9], which means that the 3rd binary symbol is inverted, the third 1 after the 3rd symbol is made 0; the $5^{th}$ 0 after the previous change is made 1; the $8^{th}$ 0 after the previous change is made 1 and the $9^{th}$ 1 after the previous change is made 0; and all changes start over again for the next symbols until symbol 128 is processed. Other schemes are possible. One can apply similar schemes to non-binary sequences, and for instance one of $4^4$ or 256 possible 4-state inverters, preferably a non-reversible inverter, is applied at a certain 4-state symbol in a sequence of 4-state symbols according to a pre-agreed rule.

Preferably, one wants to apply a sequence generator that works uninterruptedly and without the need to branch on certain conditions. A very simple way to achieve this is to use an n-state generated sequence that is modified in accordance with an n-state inverter, preferably a non-reversible one that will skew the distribution of symbols and code each n-state symbol in a plurality of h s-state symbol with s<n and h>1 and use i<h s-state symbols to form a sequence of symbols. For instance, generate a sequence of 8-state symbols with a sequence generator, modify for instance the symbol 7 to symbol 4, code the modified 8-state symbols in binary form, and take from each coded 8-state symbol a single bit, such as the least significant bit, to create a sequence of binary symbols. Other rules to select a bit are of course possible. One may also code an 8-state symbol in 4-state symbols or other valued symbols.

In general, one generates a sequence with a shift register with feedback, either a binary sequence or a non-binary sequence. Except by modifying the configuration of a sequence generator, the sequence generated is completely determined by a fixed configuration. Except perhaps for the initial state of the sequence generator, the sequence is determined and can be created or analyzed based on a known structure of the sequence generator.

If the content of the shift register is important as in a hash code generator, on may add a level of confusion by modifying inverter 2703 at certain moment during the hashing cycles as is illustrated in FIG. 27.

If one wants to generate the same sequence or hashcode after a certain time or in another computing device, one should have a scheme that determines what the changes are and after which processing cycles.

The 'forbidden' word conventionally does not contribute to the sequence on the output of a sequence generator. One would generally also not want a shift register of a sequence generator to get into the forbidden state, because it will stay in that state. A sequence generated by an n-state shift register based sequence generator is indicative of the states of the sequence generator.

FIG. 2 reveals what a relationship is between a generated sequence and the states of a shift register in a shift register with feedback in Fibonacci configuration. In the binary case the inverters h0 and h4, the first feedback tap and the last feedback tap, are in the binary case generally straight connections or identity inverters. Following the flow of the binary symbols, the state of the shift register is a series of previously generated symbols. If a symbol a1 is generated on 204 at moment t1, then the first symbol in the shift register at moment t1+1 is also a1.

The relationship between symbols generated and shift register content determines how a maximum length (ML) sequence is defined. For an autonomous running n-state sequence generator as in FIG. 2 and in FIG. 1 with k shift register elements the definition is: a ML sequence is a sequence of n-state symbols generated by an n-state shift register of k shift register elements with feedback, the sequence having a length of at least $n^k-1$ symbols wherein a content of the shift register for each of the at least at least $n^k-1$ generating cycles is unique. In general the shift register has one forbidden state that will not appear during operation.

Assume that a binary 3-stage shift register sequence generator in Fibonacci configuration generates the symbols [a1 a2 a3 a4 a5 a6 a7 a1 a2 a3 . . . ] at moments [t1 t2 t3 . . . ]. The following table shows the shift register contents and the generated symbols.

| time | s1 | s2 | s3 | symbol_5 |
|------|----|----|----|----------|
| t1 | ? | ? | ? | a1 |
| t2 | a1 | ? | ? | a2 |
| t3 | a2 | a1 | ? | a3 |
| t4 | a3 | a2 | a1 | a4 |
| t5 | a4 | a3 | a2 | a5 |
| t6 | a5 | a4 | a3 | a6 |
| t7 | a6 | a5 | a4 | a7 |
| t8 | a7 | a6 | a5 | a1 |
| t9 | a1 | a7 | a6 | a2 |
| t10 | a2 | a1 | a7 | a3 |

At t1 it is unknown what the content of shift register [s1 s2 s3] is. It is known that this unknown content generates a1, which is shifted into s1 at t2 while the unknown symbol previously in s1 is now in s2 and the unknown symbol previously in s2 is now in s3 at t2. This generating and shifting goes on until t7, when the last unique content of the shift register is achieved and the symbol a7 is generated. The content of [s1 s2 s3] at t7 is [a6 a5 a4]. The shift register has no further unique contents and the cycle repeats itself. This means that the content at t8 is identical to the content at t1 and the content at t9 is identical to the content at t2. Etc. Accordingly all contents are determined by the generated sequence.

This means that the symbols in a sequence [a1 a2 a3 a4 a5 a6 a7 a8 a9 a10] determine the consecutive contents of the generating sequence generator. Assuming that no initial content was known, it is assumed it is known that the generator has a 3-state shift register. This means that when a1 is generated, the content is unknown. However, when a2 is generated the content is [a1 ? ?]. At t4 the contents is [a3 a2 a1]. One can continue with the analysis with an eye of a first repeat of an already previously occurring content. From this one can determine if the generator is an ML generator. If a content only occurs after 7 cycles the generator is ML.

The above points to a process that can deliberately generate an ML sequence, without actually using a shift register. If one can find 7 shift register contents of 3 bits that are consecutive as shown in the earlier provided table, then one can take the first shift register element content as a symbol of a generated sequence. This requires that one establishes the correct consecutive contents. The method for this has been explained in US Patent Application Pub. 20070005673 to Lablans, published on Jan. 4 2007, which is incorporated herein by reference and is called the word method. The word method can be applied for generating sequences by applying binary and non-binary words of k symbols.

Further review of for instance FIG. 2 shows what happens when an ML sequence is generated by a Fibonacci sequence generator. The generator starts with a content of k symbols in the shift register. A symbol is generated and entered into the first shift register elements while the content of shift register elements or stages 1:(k−1) are shifted to the right. Shifting to the right depends on the structure of the generator. Sometimes a shift register in the literature is shown as being shifted from right to left. One has to adapt the herein provided explanation accordingly. But it does not matter to the basic working.

As was shown above, a content at for instance t4 is [a3 a2 a1] and a symbol a4 is generated. At t5 the content is [a4 a3 a2] and a symbol a5 is generated. This means that the last 2 symbols of word at t4 [a3 a2 a1] overlaps with the last 2 symbols of the word at t5[a4 a3 a2]. This is not a coincidence, but a fundamental property of Fibonacci shift register based sequence generators.

The following table provides a representation of consecutive shift register contents.

| time | | | | | | | | sequence |
|------|---|---|---|---|---|---|---|----------|
| t1 | | | | | b0 | b1 | b2 | a1 |
| t2 | | | | a1 | b0 | b1 | | a2 |
| t3 | | | a2 | a1 | b0 | | | a3 |
| t4 | | a3 | a2 | a1 | | | | a4 |
| t5 | a4 | a3 | a2 | | | | | a5 |
| t6 | a5 | a4 | a3 | | | | | a6 |
| t7 | a6 | a5 | a4 | | | | | a7 |
| t8 | a7 | a6 | a5 | | | | | a8 |

The shift register in this example is a 3-stage shift register and the content is represented by 3 symbols words. The initial content is [b0 b1 b2] which is shifted out during the shifting cycles. The words are represented in a way that demonstrates the shifting and that shows the overlap between the words. If this is a binary ML shift register based generator in Fibonacci configuration, then the content at t8 is the same as on t1. The table also provides a way to generate a sequence by pencil and paper. For instance, in the binary case, one starts with an initial word, say [0 0 1]. One selects then following words that overlap in the manner shown above. This determines an ML sequence.

| time | sequence |   |   |   |   |   |   |   |   |
|------|---|---|---|---|---|---|---|---|---|
| t1   |   |   |   |   |   | 0 | 0 | 1 | 1 |
| t2   |   |   |   |   | 1 | 0 | 0 |   | 0 |
| t3   |   |   |   | 0 | 1 | 0 |   |   | 1 |
| t4   |   |   | 1 | 0 | 1 |   |   |   | 1 |
| t5   |   | 1 | 1 | 0 |   |   |   |   | 1 |
| t6   | 1 | 1 | 1 |   |   |   |   |   | 0 |
| t7   | 0 | 1 | 1 |   |   |   |   |   | 0 |
| t8   | 0 | 0 | 1 |   |   |   |   |   | 1 |

One can see that the content repeats at t8 and that all contents from t1 to t7 are unique. One can determine the symbols from the generated sequence at $t_k$ from the first symbol in the next content at $t_{k+1}$.

Unfortunately, it is sometimes impossible to complete an ML sequence by applying a simple rule. Keeping in mind that in an ML sequence, each constituting word may only appear once, one will run in a situation wherein a word is already used and another word has to be selected. This is illustrated below to create an ML sequence of 7 symbols with forbidden word [0 0 0]. Assume that one starts with initial word [1 0 0]. A simple rule is that in each next step a 1 is added to the left. (though one may create also a rule that adds a 0). One can see that at t2 the new word is [1 1 0], which is the overlap [1 0] with a 1 placed to the left of [1 0] making it [1 1 0].

| time |       |   |   |   |   |   | sequence |
|------|-------|---|---|---|---|---|----------|
| t1   |       |   |   |   | 1 | 0 | 0        | 1 |
| t2   |       |   |   | 1 | 1 | 0 |          | 0 |
| t3   |       |   | 1 | 1 | 1 |   |          | 0 |
| t4   | error |   | 1 | 1 | 1 |   |          |   |
| t41  |       |   | 0 | 1 | 1 |   |          | 1 |
| t5   |       | 1 | 0 | 1 |   |   |          | 0 |
| t6   | error | 1 | 1 | 0 |   |   |          |   |
| t61  |       | 0 | 1 | 0 |   |   |          | 0 |
| t7   | error | 1 | 0 | 1 |   |   |          |   |
| t71  |       | 0 | 0 | 1 |   |   |          |   |
|      | error | 1 | 0 | 0 |   |   |          |   |
|      | error | 0 | 0 | 0 |   |   |          |   |

The word [1 1 0] was not yet used so this step is valid. The next step at t3 adds 1 left of overlap [1 1] in t2, making [1 1 1]. This is also valid. In the next step at t4 the overlap is [1 1] and adding a 1 to the left creates again [1 1 1]. This word was already used, so this step is not valid for creating an ML sequence and is an error in creating an ML sequence. Instead of a 1 a 0 is added to the left of [1 1] creating [0 1 1] at t41. This is a valid step and one can continue to t5 to create [1 0 1]. The overlap is [1 0] and adding a 1 to the left creates [1 1 0] which was already created at t2 and is thus invalid. This is corrected by using [0 1 0]. The next cycle runs into problems with [1 0 1] which was used t5. This is resolved by using [1 0 0] which was not yet used. However the process is now stuck because the only possible selections are [1 0 0] which was already used and [0 0 0] which is the forbidden word.

While one can do the above with pencil and paper, the development process is painfully slow and prone to errors. It was tried to do the above process for a 6 bit content to generate a 63 bit ML sequence. Not only did it take very long, also many mistakes were made and it could not be performed on a standard letter page. To perform the above process with pencil and paper by a human for a 1023 bit sequence with 10 bits words is not reasonably possible. Furthermore, it is impossible to generate signals with paper and pencil that represent a sequence and that can be used in a communication system or a data storage system.

There also is the problem of getting stuck and not being able to finish a sequence. One may generate all possible 7 bits binary (or non-binary) sequences and determine if they are made with unique words that overlap. However, that is not a process that can easily be implemented on a processor, as one cannot be sure which sequence will be generated.

One would like to have a process that would guaranteed generate a binary, or a non-binary, sequence of symbols each symbol being represented by a signal, and that is not a shift register based sequence generator. This is because we would like to generate sequences that would be impossible or difficult to be generated by shift registers. One such sequence is a sequence that consists of $n^k$ n-state symbols, formed from $n^k$ different words of k n-state symbols with n=2 or n>2. This means that the forbidden word of a shift register based sequence generator is no longer forbidden.

The following table shows the creation of an 8 bits ML sequence that includes the forbidden word [0 0 0] to generate the ML sequence.

| time |   |   |   |   |   | sequence |
|------|---|---|---|---|---|----------|
| t1   |   |   |   |   | 0 | 0 | 1 | 0 |
| t2   |   |   |   | 0 | 0 | 0 |   | 1 |
| t3   |   |   | 1 | 0 | 0 |   |   | 1 |
| t4   |   | 1 | 1 | 0 |   |   |   | 1 |
| t5   | 1 | 1 | 1 |   |   |   |   | 0 |
| t6   | 0 | 1 | 1 |   |   |   |   | 1 |
| t7   | 1 | 0 | 1 |   |   |   |   | 0 |
| t8   | 0 | 1 | 0 |   |   |   |   | 0 |

In fact one may create an m bit sequence with any other word than [0 0 0] being the forbidden word, for instance [1 0 1]. Such a sequence may not be ML. This will in fact be a 6 bit sequence as shown below.

| time |   |   |   |   |   | sequence |
|------|---|---|---|---|---|----------|
| t1   |   |   |   | 0 | 0 | 0 | 1 |
| t2   |   |   | 1 | 0 | 0 |   | 1 |
| t3   |   | 1 | 1 | 0 |   |   | 1 |
| t4   | 1 | 1 | 1 |   |   |   | 0 |
| t5   | 0 | 1 | 1 |   |   |   | 0 |
| t6   | 0 | 0 | 1 |   |   |   | 0 |
| t7   | 0 | 0 | 0 |   |   |   | 0 |

In accordance with an aspect of the present invention a processor based word method is provided that will repeatably generate a specific binary or non-binary sequence of symbols represented by signals.

Figure 34:
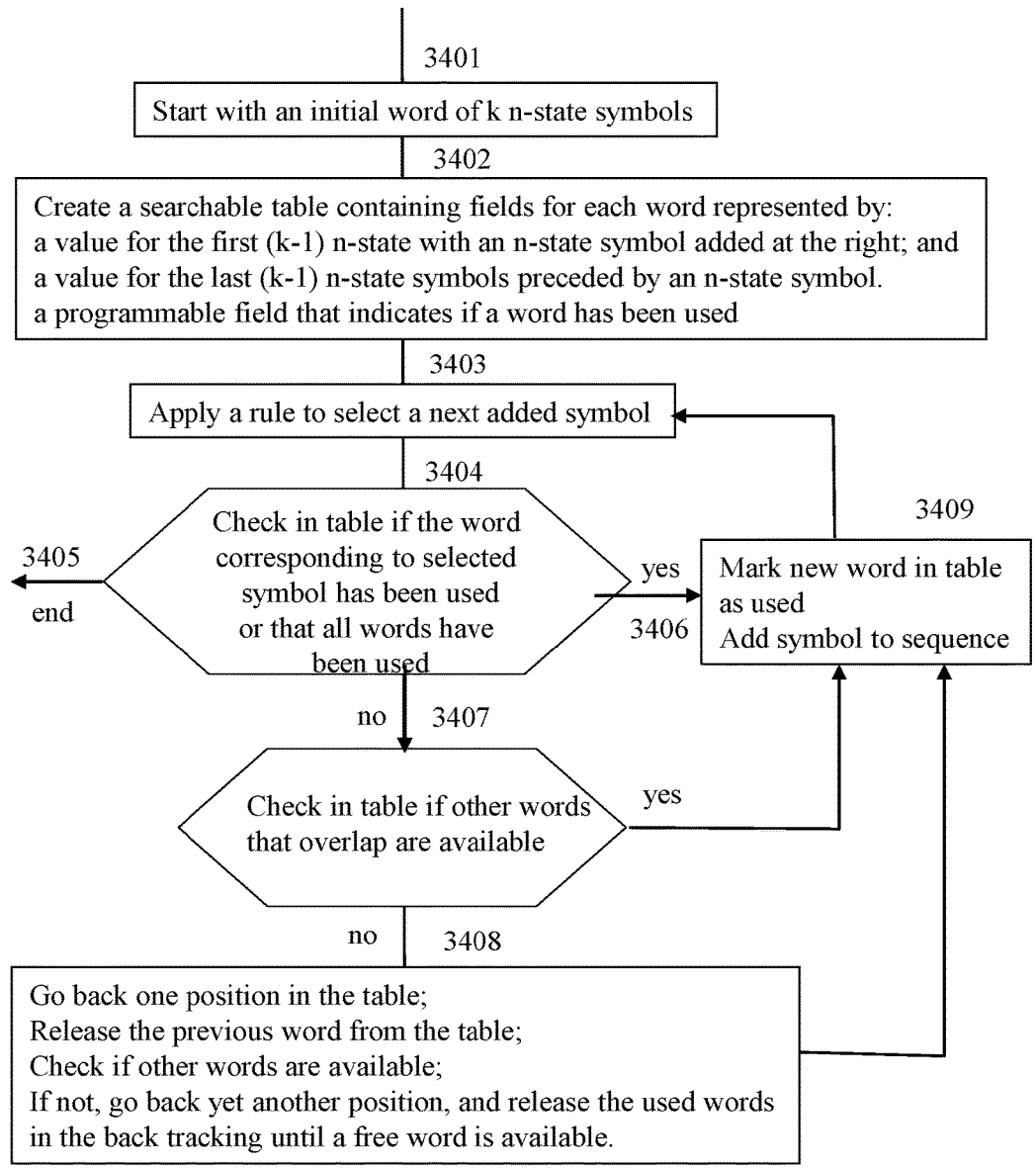
FIG. 34 illustrates a method and a device implementation provided in accordance with one or more aspects of the present invention.

The process works as illustrated in FIG. 34. At an initialization step the value of n is provided, the number of n-state symbols in the words, the number of symbols and words to be used and the first word to start from. Also provided is a rule that determines which symbol should be added to the word. For instance in the binary case, the rule may be that first a 0 is added to an overlap to the left. The rule also may be that first a 1 is added to an overlap to the left. One may also make a rule that 0s first and is first rules are intermittently applied. In fact any other that facilitates selection of a word may be applied.

As part of the method or apparatus a memory is filled with a table in step 3402 that creates a searchable table. The table has for the binary case on a first position an index and on position 2 and 3 the decimal value of the word with lead 0 (in position 2) and with lead 1 (in position 3). This is shown in FIG. 35 as a screenshot of Matlab® generating the table 3500 which is called 'firarn'. Position 4 indicates with a 0 that symbol 0 corresponding with the decimal value of position 2 has not been used and a 1 indicates that it has been used. A 9 will indicate that either use or reversal of use of the word is not allowed. Position 5 indicates with a 0 that symbol 1 corresponding with the decimal value of position 3 has not been used and a 1 indicates that it has been used. A 9 will indicate that either use or reversal of use of the word is not allowed. Positions 6 and 7 will indicate in which cycle or time slot a corresponding symbol was used.

FIG. 36 is a screenshot of a table 3600 in Matlab. The first column indicates the value of the word as well as the cycle number. The second column indicates in which time slot or cycle the word was used and column 3 indicates the generated symbol at a related time slot, keeping in mind that the leading symbol or most significant symbol of a word is used to determine the sequence. Matlab has no origin 0 for arrays. This means that all symbols are represented in origin 1. To go to origin 0 and correct decimal values one should subtract one of a value. This also is an indication that a symbol merely represents one or more signals. The switching tables, no matter the origin, provide an indication how the representation of the signals is modified. A signal may have a value, but it also may have any other differentiating characteristic, such as a wavelength or a frequency, or any other physical state that can be represented by a symbol.

The use of numbers as representation is thus a matter of tradition and of convenience if one applies arithmetic over GF(n). One could represent signals also by letters or any other convenient symbols.

In step 3403 a new word is selected based on a rule. In one implementation of this rule the processor checks in 3404 in the table if the word with the lowest value symbol is available. Other rules are fully possible and contemplated. If the word is available in 3406 the word is marked in use in 3409 and the procedure returns to 3403. If all words have been dealt with the process has reached its end and the sequence is complete in 3405. If the word is not available the next word is tested for availability in 3407. If available the procedure returns via 3409 to 3403.

If no more overlap words are available and at least one other word with no overlap is available then the procedure would possibly in an impasse. However, the inventor has realized that a wrong branch has been taken previously. Accordingly, in an embodiment of the present invention in step 3408 the procedure steps back and undoes and resets a previous word. If that does not alleviate the problem, the processor steps back one more step and so on until the procedure moves forward again.

Intuition indicates that at least one and probably many maximum length sequences of length $n^k$, $n^k-1$ and shorter can be generated.

FIG. 37 shows the tables 3701 and 3702 generated for an 8 bit ML sequence from 3 bits words with initial word [0 0 0]. FIG. 38 shows the tables 3801 and 3802 generated for an 8 bit ML sequence from 3 bits words with initial word [1 0 1]. The procedure or apparatus generates different sequences in FIGS. 37 and 38, even after looking at the sequence of FIG. 38 shifted to start at [0 0 0]. This is because [1 0 1] is compared to FIG. 37 in a position that already had other words used.

FIG. 39 shows the state diagram for the use of 6 bits words starting with [0 0 0 0 0 0] to generate an ML sequence of 64 bits. One can almost directly see that no word is duplicated. The procedure can be used in real time to generate at least 100,000 and more than million symbols or signals per second for instance with an Intel® Core™ i3-3240 CPU at 3.4 GHz. processor. If one circumvents the bottlenecks of standard processors and apply custom circuitry rates of 10,000,000 and even higher are achievable. Furthermore, image processors and signal processors work at speeds that easily cover the above range. Digital filters implemented on image processors can process well over 1 million samples per second.

The procedure of FIG. 34 implemented on a processor or in custom digital components can also be applied to generate ML sequences of non-binary symbols. This is illustrated in FIG. 40 for 64 4-state symbols generated by words of 3 4-state symbols. Screenshot 4001 generated by Matlab shows the empty standard state array for the 4-state case. Each set of 2 4-state symbols, such as [0 3] has 4 possible overlap matches being [0 0 3], [1 0 3], [2 0 3] and [3 0 3]. This explains why the table now addresses 4 columns of words. Columns 2, 6 and 10 relate to words with a leading 0; columns 3, 7 and 11 relate to words with a leading 1; columns 4, 8 and 12 relate to words with a leading 2; and columns 5, 9 and 13 relate to words with a leading 3. Screenshot 4002 shows the result for the executed procedure or apparatus. A quick view of the table 4002 shows that the start, position 1, row 1, columns 13, corresponds with 49 in row 1 at column 5. Decimal 49 in origin 1 is 48 in origin 0 and corresponds to [3 0 0]. The next word in position 2 is 13 in origin 1 or 12 in origin 0 and corresponds with [0 3 0].

One is reminded that the sequences may be used to establish security in a data file that is stored or transmitted. The purpose is to make it hard to reconstruct the way or apparatus to generate the sequence from received data, for instance by statistical analysis or by using other means.

An additional step provided to the above word method or apparatus for generating of binary and non-binary symbols is to include also symbols of words that are reversed during generation. This upsets the statistical properties of the sequence. For instance the method/apparatus as taught in FIG. 34 for binary words of 4 bits will generate in one embodiment of the present invention the sequence of 16 bits [0 1 0 0 1 1 0 1 0 1 1 1 1 0 0 0]. By including the symbols that were generated by words that were dropped and replaced by new words due to dead-end situations is a sequence of 22 bits [0 1 0 0 0 1 1 0 0 0 1 0 1 1 1 0 0 0 1 0 0 0]. If one is unfamiliar with the implemented generating rules the second sequence, which may be called an extended sequence, is hard to reconstruct. One may use a complete extended sequence for coding or $n^k$ symbols or $n^k-1$ symbols or any other part of the extended sequence.

A similar approach is provided in accordance with a further aspect of the present invention. A 4-state sequence of 64 symbols is generated by the method or apparatus executing the method of FIG. 34. The result is in one instance [3 0 0 0 1 0 0 2 0 1 1 0 1 2 0 2 1 0 2 2 0 3 1 0 3 2 1 1 1 2 1 2 2 1 3 0 1 3 1 1 3 2 2 2 3 0 2 3 1 2 3 2 3 3 0 3 3 1 3 3 3 2 0 0]. By including symbols from reversed steps one can generate an extended sequence of 76 4-state symbols that is [3 0 0 0 1 0 0 2 0 1 1 0 1 2 0 2 1 0 2 2 0 3 1 0 3 2 1 1 1 2 1 2 2 1 3 0 1 3 1 1 3 2 2 2 3 0 2 3 1 2 3 2 3 3 0 3 3 1 3 3 2 0 0 3 0 0 0 1 1 0 0 2 0 0 1 1 0 1 2 0 0 2 1 0 2 2 0 0 3 1 0 3 2 0 0 2 3 0 2 3 1 0 3 2 0 0 1 1 1 2 1 2 2 1 3 0 1 3 1 1 3 2 0 0 2 2 3 0 2 3 1 0 3 1 1 1 3 2 0 0 2 2 3 0 2 3 1 1 3 2 0 0 2 2 3 0 2 3 1 0 3 2 0 0 1 2 3 2 0 0 3 3 0 3 3 1 3 3 2 0 0 3 2 0 0].

In one embodiment of the present invention one can run the procedure for a limited number of cycles to just generate a limited number of symbols. This is different from running the procedure with a limited number of words which is also an aspect of the present invention.

The method and apparatus implementing the method of FIG. 34 are related to or inspired by shift registers with feedback in Fibonacci configuration. One aspect that is reflected in both the Fibonacci configuration shift register and the FIG. 34 approach is that the symbols move unaltered through the shift register or the words once they are entered. This is of course different with the Galois configuration. Inherent to the structure of a shift register in Galois configuration as shown in FIG. 1, is that the symbols shifted through the register are at least changed once during processing. That means that the approach of FIG. 34 does not apply. In accordance with an aspect of the present invention the approach of FIG. 34 is adapted or modified to require that consecutive words from a set of unique words of k n-state symbols with n being 2 or greater than 2 have in an overlap part at least one different symbol. The following table illustrates a binary example of this aspect of the present invention.

| time | | | | | | | sequence |
|---|---|---|---|---|---|---|---|
| t1 | | | | 0 | 0 | 0 | 0 |
| t2 | | | 0 | 1 | 0 | | 0 |
| t3 | | | 0 | 1 | 1 | | 1 |
| t4 | | 1 | 1 | 1 | | | 0 |
| t5 | 0 | 0 | 1 | | | | 1 |
| t6 | 1 | 1 | 0 | | | | 1 |
| t7 | 1 | 0 | 1 | | | | 1 |
| t8 | 1 | 0 | 0 | | | | 0 |

The following table illustrates a processor process to apply the following rule: start creating a sequence from 8 3 bits words to be used all, only once. First use words preceded by a 0, after not available use words preceded by 1, if not available: step back and release previously used words and move forward if a word is available. Include optionally the symbols of the words that have been reversed. Furthermore, all bits in the second position in a word have to change to the opposite in the consecutive word, while the first bit is shifted unaltered to the second position.

| time | | | | | | | | | |
|---|---|---|---|---|---|---|---|---|---|
| t1 | | | | | 0 | 0 | 1 | | |
| t2 | | | | 1 | 0 | 1 | | | |
| t3 | | | 0 | 1 | 1 | | | | |
| t4 | | 0 | 0 | 0 | c | 1 | 0 | 0 | |
| t5 | p | 0 | 1 | ↑ | 1 | 1 | 1 | | |
| t6 | | | 0 | 1 | 0 | c | 1 | 1 | 0 |
| t7 | | | 0 | 0 | 0 | ↑ | 0 | 1 | 0 |
| t8 | p | 0 | 1 | ↑ | 0 | 0 | 0 | | |

One can see that after [0 0 0] a dead-end position is reached, because only [0 0 1] and [1 0 0] can be formed which are already used, indicated as [p 0 1]. The program goes up one position and checks if an alteration of [0 0 0] to [1 0 0] is possible. yes: because [1 0 0] had not been used yet. The word [0 0 0] is replaced by [1 0 0] and [0 0 0] is released. Proceeding with the rules one runs again into trouble at [0 0 0]. The programs goes back to [0 1 0] and checks if [1 1 0] is still available. The answer is yes and this modification leads to a successful end. The 8 bit sequence is [1 1 1 0 1 0 0 0]. The extended sequence, using all generated bits is [1 1 1 0 0 1 0 0 0 0 0].

A similar approach is applied as an illustrative example to generate a sequence of 16 symbols from 4 bits words.

| t1 | | | | | | | | | | 0 | 0 | 0 | 1 |
|---|---|---|---|---|---|---|---|---|---|---|---|---|---|
| t2 | | | | | | | | | 0 | 1 | 0 | 0 | |
| t3 | | | | | | | | 0 | 1 | 1 | 0 | | |
| t4 | | | | | | | 0 | 1 | 1 | 1 | | | |
| t5 | | | | | | 1 | 1 | 1 | 1 | | | | |
| t6 | | | | | 0 | 0 | 1 | 1 | | | | | |
| t7 | | | | 0 | 1 | 0 | 1 | | | | | | |
| t8 | | | 1 | 1 | 1 | 0 | | | | | | | |
| t9 | | 1 | 0 | 1 | 1 | | | | | | | | |
| t10 | | 1 | 0 | 0 | 1 | | | | | | | | |
| t11 | 0 | 0 | 0 | 0 | | | c | | 1 | 0 | 0 | 0 | |
| t12 | 1 | 1 | 0 | 0 | | | ↑ | | 0 | 0 | 0 | 0 | |
| t13 | 0 | 0 | 1 | 0 | c | 1 | 0 | 1 | 0 | ↑ | 1 | 1 | 0 | 0 |
| t14 | 1 | 1 | 0 | 1 | ↑ | p | 0 | 0 | 1 | ↑ | 0 | 0 | 1 | 0 |
| t15 | 1 | 0 | 1 | 0 | ↑ | | | | | | 1 | 1 | 0 | 1 |
| t16 | p | 0 | 0 | 1 | ↑ | | | | | | 1 | 0 | 1 | 0 |

The words preceded by p such as [p 0 0 1] are dead ends and the programs goes back, releases words until a word is reached that can be changed. One can determine the 16 bits sequence and the extended sequence from the last bit of each word.

It should be apparent that for nonbinary words basically the same approach is used with the difference that instead of a choice between a preceding 0 or 1 a choice must be made between 0, 1 up to (n−1) symbols to precede. The following table illustrates the generation of a sequence of 16 4-state symbols created from words of 2 4-state symbols. The overlap rule is in this case that in moving from the first to the second position in consecutive words the symbol always changes. The change is always from low to high. That is, the program first considers words preceded by 0, then by 1, then by 2 and only then by 3 in this example. Other rules, other nonbinary symbols and other sizes of words are possible and fully contemplated. The example is provided to maintain some possibility of overview. Words of 3 4-state symbols generate a sequence of 64 4-state symbols, which will become unruly on paper. This also an indication why only a processor can generate sequences that are sufficiently long (greater than 16 symbols) be it binary or nonbinary, and that are generated in real-time to generate or to process signals for data transmission and data storage. This generation process cannot reasonably be performed in a short time by a human with pencil and paper.

| | | | | | | | | | |
|---|---|---|---|---|---|---|---|---|---|
| t1  |   |   |   |   |   |   |   | 0 | 1 |
| t2  |   |   |   |   |   |   | 1 | 1 |   |
| t3  |   |   |   |   |   |   | 0 | 0 |   |
| t4  |   |   |   |   |   | 2 | 1 |   |   |
| t5  |   |   |   |   | 1 | 0 |   |   |   |
| t6  |   |   |   |   | 2 | 0 |   |   |   |
| t7  |   |   |   | 3 | 0 |   |   |   |   |
| t8  |   |   |   | 3 | 1 |   |   |   |   |
| t9  |   |   | 0 | 2 |   |   |   |   |   |
| t10 |   |   | 1 | 2 |   |   |   |   |   |
| t11 |   | 2 | 2 |   |   |   |   |   |   |
| t12 | 0 | 3 | c | 1 | 3 |   |   |   |   |
| t13 | 3 | 2 | ↑ | 3 | 2 |   |   |   |   |
| t14 | p | p | 0 | 3 |   |   |   |   |   |
| t15 |   | 2 | 3 |   |   |   |   |   |   |
| t16 |   | 3 | 3 |   |   |   |   |   |   |

The table also shows that the rule as applied creates a sequence wherein most of the 0s are generated at the start of the sequence and most of the 3s at the end of the sequence. In accordance with an aspect of the present invention the sequence of nonbinary symbols is generated by an adaptive rule of selecting words with a preceding symbol. The rule thus first looks for a next word with symbol p0, and looks for the following word with a preceding symbol p1, etc. until in a cycle a word is selected with symbol $p_{n-1}$ and the rule goes back to select symbol p0. In one embodiment of the present invention the symbols, p0, p1, . . . $p_{n-1}$ are 0, 1, . . . , n−1. In one embodiment of the present invention other mixtures of preferred looking for preceding symbols are applied. This applies for nonbinary and binary Fibonacci and Galois substitution methods and apparatus.

In accordance with an aspect of the present invention a content of a shift register is modified during operation of a binary or nonbinary shift register with feedback. It has already been provided that during operation of a shift register with feedback the functions and taps may be modified. In yet another embodiment of the present invention a processor runs instructions that implement the apparatus. In addition, the processor or implementation checks for an occurrence of a predefined state of the shift register. For instance, in a binary or nonbinary device the forbidden word may be [0 0 . . . 0] or all zero. In a non-binary device the forbidden state may be [2 2 2 . . . 2] or all 2. There are different possible embodiments of this aspect of the present invention.

Figure 41:
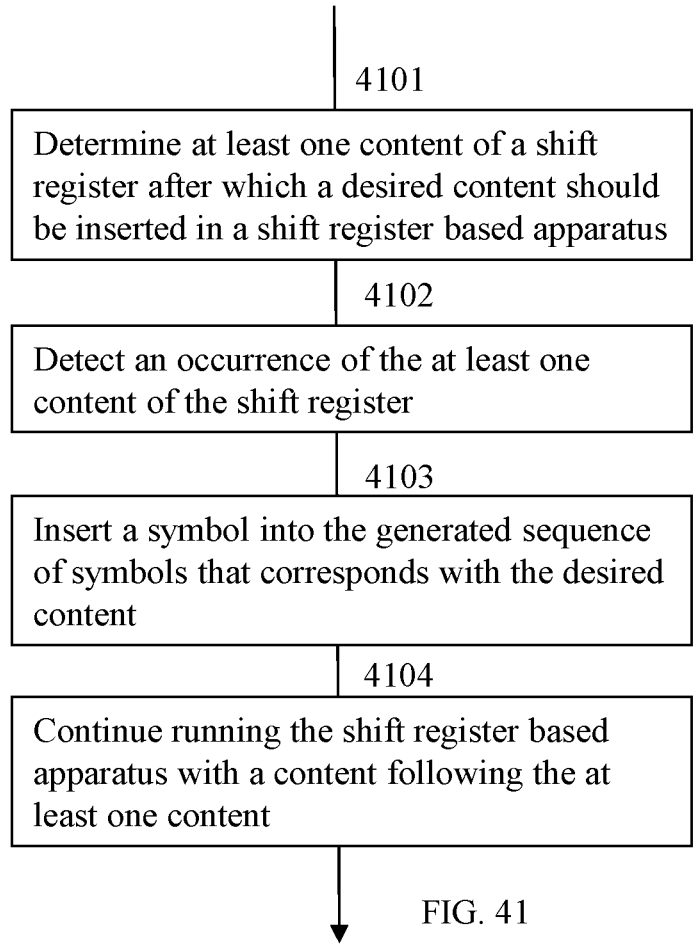
FIG. 41 illustrates a method provided in accordance with one or more aspects of the present invention.

FIG. 41 illustrates one embodiment wherein after an occurrence of a predetermined content a symbol is inserted in a generated signal that may depend on a state of an inserted content. Thereafter, the generator may continue with the correct content. In step 4101 a content of the shift register is provided after which some action is to be taken. The action can be any action: an insertion of one or more symbols into a sequence. In that case it looks like the shift register continues to operate but it is actually paused. Assume for the example that the sequence generator has [0 0 0 0] as a forbidden word. This means that when the generator is running autonomously, without external interference and did not start from the forbidden word, it will never achieve the forbidden word. One may want it look as if some nonlinear feedback is applied that forces a content that is close to [0 0 0 0], such as [0 0 0 1] or [0 0 0 3] in a 4-state case, into [0 0 0 0].

The processor monitors the content of the shift register in step 4102 and detects when the shift register has a content [0 0 0 1] for instance. In one embodiment of the present invention the generator continues to generate the output of the generator into the sequence, but does not update the new content of the shift register, which is for instance in actuality [1 0 0 0]. It may also be that because it is known that [1 0 0 0] would follow [0 0 0 1] the new word is already programmed.

Figure 42:
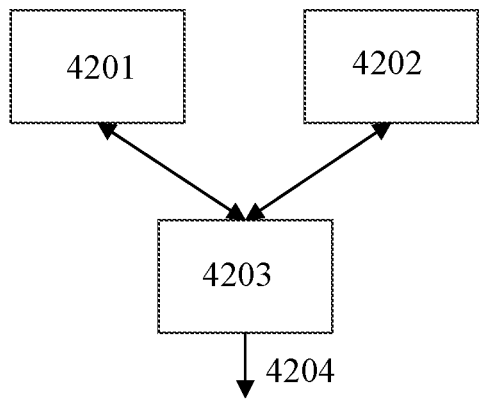
FIGS. 42-44 illustrate devices provided in accordance with one or more aspects of the present invention.

Instead of continuing the running of the shift register a symbol corresponding to a forbidden word, for instance a 0, is inserted into the generated sequence in step 4103. In accordance with an aspect of the present invention, also more than 1 symbol may be inserted, and the inserted symbols may be different symbols. After insertion of the symbols into the sequence, the follow-up content [1 0 0 0] is used in the shift register to continue generating symbols in step 4104. However, also an entirely different content may be applied. For instance, assume that the generator is an ML generator. If one inserts 3 symbols, one may determine the content of the shift register after 3 cycles and use that content to have the shift register based sequence generator generate the next symbol. A system to implement the above sequence generator is illustrated in FIG. 42. A binary or non-binary shift register with feedback is implemented on a processor 4201. The processor may be a general processor or a customized processor. It provides signals representing binary or nonbinary symbols to a processor 4203. A memory 4202 has the register state on which should be monitored for, the restart content and symbols that are to be inserted. Processor 4202 also uses a clock that is synchronous with a clock for generator 4201.

The interaction between 4203 and 4201 in one embodiment of the present invention is dual in the sense that 4203 receives data or signals from 4201, but also may instruct 4201. In one embodiment of the present invention 4203 acts like a switch that is switched to pass signals or data from 4201 to output 4204 or switch to data generated by 4202 to 4204. In one embodiment the entire system of FIG. 42 is implemented on a programmable processor with memory with at least a D/A conversion circuit that converts internal data formats or symbols of processor 4203 to a signal that can be provided on 4202 to be transmitted or further processed.

In a nonbinary case, the word [2 2 2 2] may be the forbidden word. That generally means that [0 0 0 0], [1 1 1 1] and [3 3 3 3] in a 4-state case are valid contents. In one embodiment the symbol corresponding to the forbidden word is inserted into the sequence of generated symbols. In one embodiment of the present invention one may remove a content and a symbol related to one or more or even all same symbol content of the shift register.

The methods as provided herein are in one embodiment of the present invention implemented on a system or a computer device. A system illustrated in FIG. 43 and as described herein is enabled for receiving, processing and generating data. The system is provided with data that can be stored on a memory 4301. Data may be obtained from a sensor or may be provided from a data source. Data may be provided on an input 4306.

Figure 43:
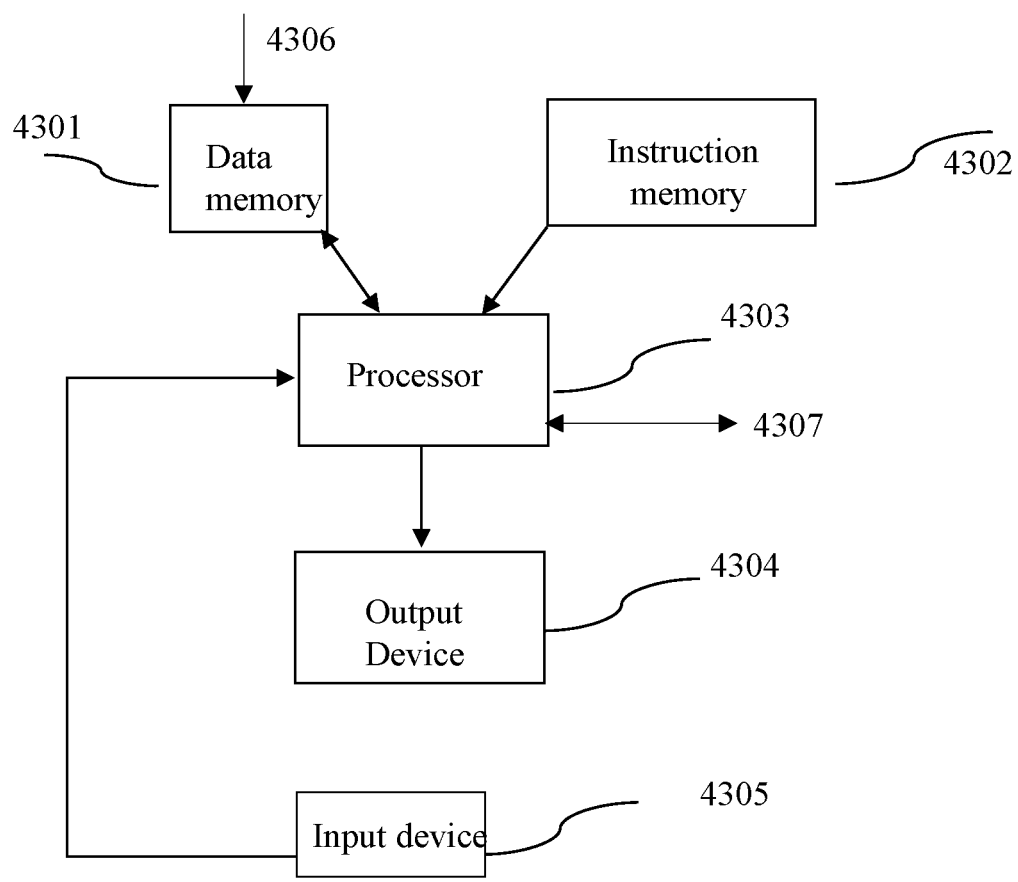

The processor is also provided or programmed with an instruction set or program executing the methods of the present invention is stored on a memory 4302 and is provided to the processor 4303, which executes the instructions of 4302 to process the data from 4301. Data, such as an image or any other signal resulting from the processor can be outputted on an output device 4304, which may be a display to display data or a loudspeaker to provide an acoustic signal or a storage device to store data or another processor to process sequences for instance to further code or decode a stream of data symbols represented by signals. The processor also has a communication channel 4307 to receive external data from a communication device and to transmit data, for instance to an external device. The system in one embodiment of the present invention has an input device 4305, which may be a keyboard, a mouse, a touch pad or any other device that can generated data to be provided to processor 4303. The processor can be dedicated hardware. However, the processor can also be a CPU or any other computing device that can execute the instructions of 4302. Accordingly, the system as illustrated in FIG. 43 provides a system for data processing resulting from a sensor or any other data source and is enabled to execute the steps of the methods as provided herein as an aspect of the present invention.

Figure 44:
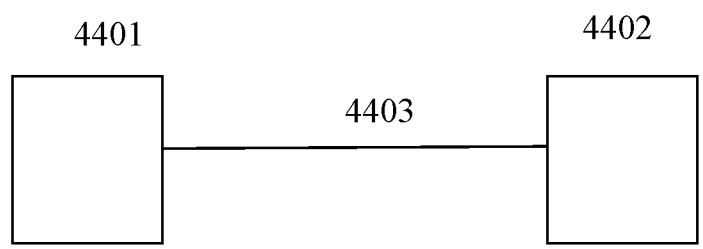

A system that applies aspects of the invention as provided herein is a communication system as shown in FIG. 44, including at least two devices that communicate of which a first device 4401 transmits n-state symbols which can be binary symbols or symbols with n>2 over a channel 4403 and a second device 4402 receives and synchronizes with n-state symbols transmitted by the first device. Devices in such a communication system in one embodiment transmit over a wireless channel 4403. In a further embodiment, the devices transmit at least over part of a transmission channel over a wired transmission channel 4403, which may be an optical fiber medium or a metallic medium. A system in another embodiment is a data storage system wherein a device 4401 reads n-state symbols from a medium 4402. Such a medium in one embodiment is an electronic memory. In a further embodiment a storage medium is a magnetic medium. In yet a further embodiment, a storage medium is an optical, an electro-optical, or a magneto-optical medium. In yet a further embodiment, a storage medium is a medium that can store n-state symbols and is enabled to be read by a reader to read the n-state symbols from the medium.

An n-state symbol can be represented by a plurality of binary symbols or by a single n-state symbol or is a binary symbol. It was already explained earlier that a symbol does not exist with a device, but is a signal or a physical mark on a material. A symbol on a medium is in one embodiment a modification of the medium at a certain location which can be called a mark. A mark can be a change in an electronic, magnetic, optical, chemical, quantum-mechanical, biological, or mechanical property or a combination thereof. A mark can also be represented by a logical state of a device, which may be reflected in a dynamical switching property such as exhibited by a memory latch. A mark can also be represented by a physical state of a material. A symbol is also a representation of a signal. A processor processes signals, which for convenience herein is said to process symbols.

Novel binary and nonbinary nonlinear feedback shift registers have been provided herein in accordance with various aspects of the present invention. Also additional methods and apparatus have been provided that generate unconventional binary and nonbinary sequences. The term 'unconventional' indicates that there are currently no apparatus or methods that generate these unconventional sequences and that there are no apparatus that can generate them.

Non-commutative switching devices can be created from memory and from a commutative combinatorial switching device with an inverter at an input.

The following patent applications, including the specifications, claims and drawings, are hereby incorporated by reference herein, as if they were fully set forth herein: (1) U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; (2) U.S. Pat. No. 7,002,490 issued on Feb. 21, 2006, entitled TERNARY AND HIGHER MULTI-VALUE SCRAMBLERS/DESCRAMBLERS; (3) U.S. Non-Provisional patent application Ser. No. 10/912,954, filed Aug. 6, 2004, entitled TERNARY AND HIGHER MULTI-VALUE SCRAMBLERS/DESCRAMBLERS; (4) U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA; (5) U.S. Pat. No. 7,218,144, issued on May 15, 2007, entitled SINGLE AND COMPOSITE BINARY AND MULTI-VALUED LOGIC FUNCTIONS FROM GATES AND INVERTERS; (6) U.S. patent Ser. No. 11/065,836 filed Feb. 25, 2005, entitled GENERATION AND DETECTION OF NON-BINARY DIGITAL SEQUENCES; (7) U.S. Pat. No. 7,397,690 issued on Jul. 8, 2008, entitled MULTI-VALUED DIGITAL INFORMATION RETAINING ELEMENTS AND MEMORY DEVICES; (8) U.S. Non-Provisional patent application Ser. No. 11/618,986, filed Jan. 2, 2007, entitled Ternary and Multi-Value Digital Signal Scramblers, Descramblers and Sequence Generators; (9) U.S. Non-Provisional patent application Ser. No. 11/679,316 filed Feb. 27, 2007, entitled Methods And Apparatus In Finite Field Polynomial Implementations; (9) U.S. Non-Provisional patent application Ser. No. 11/566,725, filed on Dec. 5, 2006, entitled: Error Correcting Decoding For Convolutional And Recursive Systematic Convolutional Encoded Sequences; (10) U.S. Non-Provisional patent application Ser. No. 11/739,189, filed on Apr. 24, 2007 entitled: Error Correction By Symbol Reconstruction In Binary And Multi-Valued Cyclic Codes; (11) U.S. Non-Provisional patent application Ser. No. 11/969,560 filed Jan. 4, 2008, entitled: Symbol Error Correction by Error Detection and Logic Based Symbol Reconstruction; (12) U.S. Non-Provisional patent application Ser. No. 11/964,507 filed on Dec. 26, 2007 entitled Implementing Logic Functions With Non-Magnitude Based Physical Phenomena.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims.

The invention claimed is:

1. A device to provide a sequence of signals, comprising:
a shift register with feedback with k shift register elements with k>1 including a feedback path from a kth shift register element to a first shift register element, the shift register with feedback containing at least a feedback path that includes a first two-input binary switching device, wherein a switching performance of the first two-input binary switching device is characterized by a non-associative binary truth table selected from the group consisting of non-commutative switching function truth tables; and
an output to provide the sequence of signals.

2. The device of claim 1, wherein the shift register with feedback has a Fibonacci configuration.

3. The device of claim 1, wherein the shift register with feedback has a Galois configuration.

4. The device of claim 1, wherein the device is an autonomously running sequence generator.

5. The device of claim 1, wherein the device is a signal scrambler.

6. The device of claim 5, further comprising a corresponding signal descrambler.

7. The device of claim 1, wherein the device is part of a hash code generator.

8. The device of claim 1, wherein:
the device is realized on a processor with a memory that stores a configuration of the shift register with feedback;
the memory storing a configuration of a second shift register with feedback, the configurations of the shift register with feedback and the second shift register with feedback being characterized by one or more parameters of which at least one parameter of the configuration of the second shift register with feedback is different from the configuration of the shift register with feedback; and
the processor is enabled to be reconfigured in accordance with the configuration of the second shift register with feedback.

9. The device of claim 1, wherein the device is part of a communication device.

10. A method to provide a sequence of signals, comprising:
generating the sequence of signals with a shift register with feedback with k shift register elements with k>1 including a feedback path between the kth shift register element and the first shift register element, the shift register with feedback containing at least a feedback path that includes a first two-input binary switching device that is characterized by a non-associative binary truth table selected from the group consisting of non-commutative switching function truth tables; and
providing the sequence of signals on an output.

11. The method of claim 10, wherein the shift register is part of a stream cipher device.

12. The method of claim 10, the shift register with feedback further comprising at least one feedback tap with an always-on inverter, the always-on inverter being characterized by an output that has a binary state represented by 1 that is independent of an input state.

13. The method of claim 10, wherein the shift register with feedback is part of a signal scrambler.

14. The method of claim 10, wherein the shift register with feedback is part of a hash code generator.

15. The method of claim 10, further comprising:
realizing the shift register with feedback on a processor with a memory storing a configuration of the shift register with feedback;
storing on the memory a configuration of a second shift register with feedback, each configuration being characterized by one or more parameters of which at least one parameter of the second shift register with feedback is different from the configuration of the shift register with feedback; and
reconfiguring the processor in accordance with the configuration of the second shift register with feedback.

16. The method of claim 15, wherein the one or more parameters are selected from the group consisting of: number of n switching states of an n-state switching function with n being equal or greater than 2, a truth table of the n-state switching function, a feedback tap configuration and a length of the second shift register with feedback.

17. The method of claim 10, wherein the shift register with feedback is part of a communication device.

18. A device, comprising:
a binary shift register with feedback with a plurality of shift register elements;
a feedback tap in the binary shift register containing an always-on inverter, the always-on inverter being characterized by an output that has a binary state represented by 1 that is independent of an input state; and
an output of the device to generate a sequence of signals processed by the binary shift register.

19. The device of claim 18, further comprising, a feedback path in the binary shift register, containing a switching element that is characterized by a non-associative truth table selected from the group consisting of non-commutative binary switching function truth tables.

20. The device of claim 18, wherein the device is a stream cipher device.

* * * * *